(12) United States Patent
Olshansky

(10) Patent No.: US 11,127,232 B2
(45) Date of Patent: Sep. 21, 2021

(54) MULTI-CAMERA, MULTI-SENSOR PANEL DATA EXTRACTION SYSTEM AND METHOD

(71) Applicant: On Time Staffing Inc., Golden Valley, MN (US)

(72) Inventor: Roman Olshansky, Plymouth, MN (US)

(73) Assignee: On Time Staffing Inc., Golden Valley, MN (US)

( * ) Notice: Subject to any disclaimer, the term of this patent is extended or adjusted under 35 U.S.C. 154(b) by 0 days.

(21) Appl. No.: 16/696,781

(22) Filed: Nov. 26, 2019

(65) Prior Publication Data
US 2021/0158636 A1    May 27, 2021

(51) Int. Cl.
| | |
|---|---|
| *H04N 5/00* | (2011.01) |
| *G07C 5/08* | (2006.01) |
| *H04N 5/77* | (2006.01) |
| *H04N 7/18* | (2006.01) |
| *H04R 3/00* | (2006.01) |
| *H04R 5/027* | (2006.01) |

(52) U.S. Cl.
CPC ......... *G07C 5/0891* (2013.01); *G07C 5/0858* (2013.01); *G07C 5/0866* (2013.01); *H04N 5/77* (2013.01); *H04N 7/181* (2013.01); *H04R 3/005* (2013.01); *H04R 5/027* (2013.01)

(58) Field of Classification Search
CPC .. G07C 5/0891; G07C 5/0858; G07C 5/0866; H04N 5/77; H04N 7/181; H04R 3/005; H04R 5/027
See application file for complete search history.

(56) References Cited

U.S. PATENT DOCUMENTS

| | | |
|---|---|---|
| 3,764,135 A | 10/1973 | Madison |
| 5,109,281 A | 4/1992 | Kobori et al. |

(Continued)

FOREIGN PATENT DOCUMENTS

| | | |
|---|---|---|
| AU | 2002310201 | 3/2003 |
| CA | 2206105 | 12/2000 |

(Continued)

OTHER PUBLICATIONS

File History for U.S. Appl. No. 16/366,746 downloaded Jan. 21, 2020 (226 pages).

(Continued)

*Primary Examiner* — Zhihan Zhou
(74) *Attorney, Agent, or Firm* — Pauly, DeVries Smith & Deffner LLC

(57) ABSTRACT

A system and method are presented for combining visual recordings from a camera, audio recordings from a microphone, and behavioral data recordings from behavioral sensors, during a panel discussion. Cameras and other sensors can be assigned to specific individuals or can be used to create recordings from multiple individuals simultaneously. Separate recordings are combined and time synchronized, and portions of the synchronized data are then associated with the specific individuals in the panel discussion. Interactions between participants are determined by examining the individually assigned portions of the time synchronized recordings. Events are identified in the interactions and then recorded as separate event data associated with individuals.

19 Claims, 7 Drawing Sheets

(56) References Cited

U.S. PATENT DOCUMENTS

| | | |
|---|---|---|
| 5,410,344 A | 4/1995 | Graves et al. |
| 5,835,667 A | 11/1998 | Wactlar et al. |
| 5,867,209 A | 2/1999 | Irie et al. |
| 5,884,004 A | 3/1999 | Sato et al. |
| 5,886,967 A | 3/1999 | Aramaki |
| 5,897,220 A | 4/1999 | Huang et al. |
| 5,906,372 A | 5/1999 | Recard, Jr. |
| 5,937,138 A | 8/1999 | Fukuda et al. |
| 5,949,792 A | 9/1999 | Yasuda et al. |
| 6,128,414 A | 10/2000 | Liu |
| 6,229,904 B1 | 5/2001 | Huang et al. |
| 6,289,165 B1 | 9/2001 | Abecassis |
| 6,484,266 B2 | 11/2002 | Kashiwagi et al. |
| 6,502,199 B2 | 12/2002 | Kashiwagi et al. |
| 6,504,990 B1 | 1/2003 | Abecassis |
| RE37,994 E | 2/2003 | Fukuda et al. |
| 6,600,874 B1 | 7/2003 | Fujita et al. |
| 6,618,723 B1 | 9/2003 | Smith |
| 6,981,000 B2 | 12/2005 | Park et al. |
| 7,095,329 B2 | 8/2006 | Saubolle |
| 7,146,627 B1 | 12/2006 | Ismail et al. |
| 7,293,275 B1 | 11/2007 | Krieger et al. |
| 7,313,539 B1 | 12/2007 | Pappas et al. |
| 7,336,890 B2 | 2/2008 | Lu et al. |
| 7,499,918 B2 | 3/2009 | Ogikubo |
| 7,606,444 B1 | 10/2009 | Erol et al. |
| 7,702,542 B2 | 4/2010 | Aslanian, Jr. |
| 7,725,812 B1 | 5/2010 | Balkus et al. |
| 7,797,402 B2 | 9/2010 | Roos |
| 7,810,117 B2 | 10/2010 | Karnalkar et al. |
| 7,865,424 B2 | 1/2011 | Pappas et al. |
| 7,895,620 B2 | 2/2011 | Haberman et al. |
| 7,904,490 B2 | 3/2011 | Ogikubo |
| 7,962,375 B2 | 6/2011 | Pappas et al. |
| 7,974,443 B2 | 7/2011 | Kipman et al. |
| 7,991,635 B2 | 8/2011 | Hartmann |
| 7,996,292 B2 | 8/2011 | Pappas et al. |
| 8,032,447 B2 | 10/2011 | Pappas et al. |
| 8,046,814 B1 | 10/2011 | Badenell |
| 8,111,326 B1 | 2/2012 | Talwar |
| 8,169,548 B2 | 5/2012 | Ryckman |
| 8,185,543 B1 | 5/2012 | Choudhry et al. |
| 8,229,841 B2 | 7/2012 | Pappas et al. |
| 8,238,718 B2 | 8/2012 | Toyama et al. |
| 8,241,628 B2 | 8/2012 | Diefenbach-streiber et al. |
| 8,266,068 B1 | 9/2012 | Foss et al. |
| 8,300,785 B2 | 10/2012 | White |
| 8,301,550 B2 | 10/2012 | Pappas et al. |
| 8,301,790 B2 | 10/2012 | Morrison et al. |
| 8,326,133 B2 | 12/2012 | Lemmers |
| 8,326,853 B2 | 12/2012 | Richard et al. |
| 8,331,457 B2 | 12/2012 | Mizuno et al. |
| 8,331,760 B2 | 12/2012 | Butcher |
| 8,339,500 B2 | 12/2012 | Hattori et al. |
| 8,358,346 B2 | 1/2013 | Hikita et al. |
| 8,387,094 B1 | 2/2013 | Ho et al. |
| 8,505,054 B1 | 8/2013 | Kirley |
| 8,508,572 B2 | 8/2013 | Ryckman et al. |
| 8,543,450 B2 | 9/2013 | Pappas et al. |
| 8,560,482 B2 | 10/2013 | Miranda et al. |
| 8,566,880 B2 | 10/2013 | Dunker et al. |
| 8,600,211 B2 | 12/2013 | Nagano et al. |
| 8,611,422 B1 | 12/2013 | Yagnik et al. |
| 8,620,771 B2 | 12/2013 | Pappas et al. |
| 8,633,964 B1 | 1/2014 | Zhu |
| 8,650,114 B2 | 2/2014 | Pappas et al. |
| 8,751,231 B1 | 6/2014 | Larsen et al. |
| 8,774,604 B2 | 7/2014 | Torii et al. |
| 8,792,780 B2 | 7/2014 | Hattori |
| 8,824,863 B2 | 9/2014 | Kitamura et al. |
| 8,854,457 B2 | 10/2014 | De Vleeschouwer et al. |
| 8,856,000 B1 | 10/2014 | Larsen et al. |
| 8,902,282 B1 | 12/2014 | Zhu |
| 8,909,542 B2 | 12/2014 | Montero et al. |
| 8,913,103 B1 | 12/2014 | Sargin et al. |
| 8,918,532 B2 | 12/2014 | Lueth et al. |
| 8,930,260 B2 | 1/2015 | Pappas et al. |
| 8,988,528 B2 | 3/2015 | Hikita |
| 9,009,045 B1 | 4/2015 | Larsen et al. |
| 9,015,746 B2 | 4/2015 | Holmdahl et al. |
| 9,026,471 B2 | 5/2015 | Pappas et al. |
| 9,026,472 B2 | 5/2015 | Pappas et al. |
| 9,047,634 B2 | 6/2015 | Pappas et al. |
| 9,064,258 B2 | 6/2015 | Pappas et al. |
| 9,070,150 B2 | 6/2015 | Pappas et al. |
| 9,092,813 B2 | 7/2015 | Pappas et al. |
| 9,106,804 B2 | 8/2015 | Roberts et al. |
| 9,111,579 B2 | 8/2015 | Meaney et al. |
| 9,117,201 B2 | 8/2015 | Kennell et al. |
| 9,129,640 B2 | 9/2015 | Hamer |
| 9,135,674 B1 | 9/2015 | Yagnik et al. |
| 9,223,781 B2 | 12/2015 | Pearson et al. |
| 9,224,156 B2 | 12/2015 | Moorer |
| 9,305,286 B2 | 4/2016 | Larsen et al. |
| 9,305,287 B2 | 4/2016 | Krishnamoorthy et al. |
| 9,355,151 B1 | 5/2016 | Cranfill et al. |
| 9,378,486 B2 | 6/2016 | Taylor et al. |
| 9,398,315 B2 | 7/2016 | Oks et al. |
| 9,402,050 B1 | 7/2016 | Recchia et al. |
| 9,437,247 B2 | 9/2016 | Pendergast et al. |
| 9,438,934 B1 | 9/2016 | Zhu |
| 9,443,556 B2 | 9/2016 | Cordell et al. |
| 9,456,174 B2 | 9/2016 | Boyle et al. |
| 9,462,301 B2 | 10/2016 | Paśko |
| 9,501,663 B1 | 11/2016 | Hopkins, III et al. |
| 9,501,944 B2 | 11/2016 | Ho et al. |
| 9,544,380 B2 | 1/2017 | Deng et al. |
| 9,554,160 B2 | 1/2017 | Han et al. |
| 9,570,107 B2 | 2/2017 | Boiman et al. |
| 9,583,144 B2 | 2/2017 | Ricciardi |
| 9,600,723 B1 | 3/2017 | Pantofaru et al. |
| 9,607,655 B2 | 3/2017 | Bloch et al. |
| 9,652,745 B2 | 5/2017 | Taylor et al. |
| 9,653,115 B2 | 5/2017 | Bloch et al. |
| 9,666,194 B2 | 5/2017 | Ondeck et al. |
| 9,684,435 B2 | 6/2017 | Carr et al. |
| 9,693,019 B1 | 6/2017 | Fluhr et al. |
| 9,710,790 B2 | 7/2017 | Taylor et al. |
| 9,723,223 B2 | 8/2017 | Banta et al. |
| 9,747,573 B2 | 8/2017 | Shaburov et al. |
| 9,792,955 B2 | 10/2017 | Fleischhauer et al. |
| 9,805,767 B1 | 10/2017 | Strickland |
| 9,823,809 B2 | 11/2017 | Roos |
| 9,876,963 B2 | 1/2018 | Nakamura et al. |
| 9,881,647 B2 | 1/2018 | Mccauley et al. |
| 9,936,185 B2 | 4/2018 | Delvaux et al. |
| 9,940,508 B2 | 4/2018 | Kaps et al. |
| 9,940,973 B2 | 4/2018 | Roberts et al. |
| 9,979,921 B2 | 5/2018 | Holmes |
| 10,008,239 B2 | 6/2018 | Eris |
| 10,019,653 B2 | 7/2018 | Wilf et al. |
| 10,021,377 B2 | 7/2018 | Newton et al. |
| 10,108,932 B2 | 10/2018 | Sung et al. |
| 10,115,038 B2 | 10/2018 | Hazur et al. |
| 10,147,460 B2 | 12/2018 | Ullrich |
| 10,152,695 B1 | 12/2018 | Chiu et al. |
| 10,152,696 B2 | 12/2018 | Thankappan et al. |
| 10,168,866 B2 | 1/2019 | Wakeen et al. |
| 10,178,427 B2 | 1/2019 | Huang |
| 10,235,008 B2 | 3/2019 | Lee et al. |
| 10,242,345 B2 | 3/2019 | Taylor et al. |
| 10,268,736 B1 | 4/2019 | Balasia et al. |
| 10,296,873 B1 | 5/2019 | Balasia et al. |
| 10,310,361 B1 | 6/2019 | Featherstone |
| 10,318,927 B2 | 6/2019 | Champaneria |
| 10,325,243 B1 | 6/2019 | Ross et al. |
| 10,325,517 B2 | 6/2019 | Nielson et al. |
| 10,346,805 B2 | 7/2019 | Taylor et al. |
| 10,346,928 B2 | 7/2019 | Li et al. |
| 10,353,720 B1 | 7/2019 | Wich-vila |
| 10,433,030 B2 | 10/2019 | Packard et al. |
| 10,438,135 B2 | 10/2019 | Larsen et al. |
| 10,607,188 B2 | 3/2020 | Kyllonen et al. |
| 10,657,498 B2 | 5/2020 | Dey et al. |

(56) References Cited

U.S. PATENT DOCUMENTS

| | | | |
|---|---|---|---|
| 10,694,097 B1 | 6/2020 | Shirakyan | |
| 10,728,443 B1 | 7/2020 | Olshansky | |
| 10,735,396 B2 | 8/2020 | Krstic et al. | |
| 10,748,118 B2 | 8/2020 | Fang | |
| 10,796,217 B2 | 10/2020 | Wu | |
| 10,963,841 B2 | 3/2021 | Olshansky | |
| 11,023,735 B1 | 6/2021 | Olshansky | |
| 2001/0001160 A1 | 5/2001 | Shoff et al. | |
| 2001/0038746 A1 | 11/2001 | Hughes et al. | |
| 2002/0097984 A1 | 7/2002 | Abecassis | |
| 2002/0113879 A1 | 8/2002 | Battle et al. | |
| 2002/0122659 A1 | 9/2002 | Mcgrath et al. | |
| 2002/0191071 A1 | 12/2002 | Rui et al. | |
| 2003/0005429 A1 | 1/2003 | Colsey | |
| 2003/0027611 A1 | 2/2003 | Recard | |
| 2003/0189589 A1 | 10/2003 | Leblanc et al. | |
| 2003/0194211 A1 | 10/2003 | Abecassis | |
| 2004/0033061 A1 | 2/2004 | Hughes et al. | |
| 2004/0186743 A1 | 9/2004 | Cordero | |
| 2004/0264919 A1 | 12/2004 | Taylor et al. | |
| 2005/0095569 A1 | 5/2005 | Franklin | |
| 2005/0137896 A1 | 6/2005 | Pentecost et al. | |
| 2005/0187765 A1 | 8/2005 | Kim et al. | |
| 2005/0232462 A1 | 10/2005 | Vallone et al. | |
| 2005/0235033 A1 | 10/2005 | Doherty | |
| 2005/0271251 A1 | 12/2005 | Russell et al. | |
| 2006/0042483 A1 | 3/2006 | Work et al. | |
| 2006/0045179 A1 | 3/2006 | Mizuno et al. | |
| 2006/0100919 A1 | 5/2006 | Levine | |
| 2006/0116555 A1 | 6/2006 | Pavlidis et al. | |
| 2006/0229896 A1 | 10/2006 | Rosen et al. | |
| 2007/0088601 A1 | 4/2007 | Money et al. | |
| 2007/0124161 A1 | 5/2007 | Mueller et al. | |
| 2007/0237502 A1 | 10/2007 | Ryckman et al. | |
| 2007/0288245 A1 | 12/2007 | Benjamin | |
| 2008/0086504 A1 | 4/2008 | Sanders et al. | |
| 2009/0083103 A1 | 3/2009 | Basser | |
| 2009/0083670 A1 | 3/2009 | Roos | |
| 2009/0087161 A1 | 4/2009 | Roberts et al. | |
| 2009/0144785 A1 | 6/2009 | Walker et al. | |
| 2009/0171899 A1 | 7/2009 | Chittoor et al. | |
| 2009/0248685 A1 | 10/2009 | Pasqualoni et al. | |
| 2009/0258334 A1 | 10/2009 | Pyne | |
| 2010/0086283 A1 | 4/2010 | Ramachandran et al. | |
| 2010/0143329 A1 | 6/2010 | Larsen | |
| 2010/0183280 A1* | 7/2010 | Beauregard | G11B 27/034 |
| | | | 386/285 |
| 2010/0191561 A1 | 7/2010 | Jeng et al. | |
| 2010/0199228 A1* | 8/2010 | Latta | G06F 3/011 |
| | | | 715/863 |
| 2010/0223109 A1 | 9/2010 | Hawn et al. | |
| 2010/0325307 A1 | 12/2010 | Roos | |
| 2011/0055098 A1 | 3/2011 | Stewart | |
| 2011/0055930 A1 | 3/2011 | Flake et al. | |
| 2011/0060671 A1 | 3/2011 | Erbey et al. | |
| 2011/0076656 A1 | 3/2011 | Scott et al. | |
| 2011/0088081 A1 | 4/2011 | Folkesson et al. | |
| 2011/0135279 A1 | 6/2011 | Leonard | |
| 2012/0036127 A1 | 2/2012 | Work et al. | |
| 2012/0053996 A1 | 3/2012 | Galbavy | |
| 2012/0084649 A1 | 4/2012 | Dowdell et al. | |
| 2012/0114246 A1 | 5/2012 | Weitzman | |
| 2012/0130771 A1 | 5/2012 | Kannan et al. | |
| 2012/0257875 A1 | 10/2012 | Sharpe et al. | |
| 2012/0271774 A1 | 10/2012 | Clegg | |
| 2013/0007670 A1 | 1/2013 | Roos | |
| 2013/0016815 A1 | 1/2013 | Odinak et al. | |
| 2013/0016816 A1 | 1/2013 | Odinak et al. | |
| 2013/0016823 A1 | 1/2013 | Odinak et al. | |
| 2013/0024105 A1 | 1/2013 | Thomas | |
| 2013/0111401 A1 | 5/2013 | Newman et al. | |
| 2013/0121668 A1 | 5/2013 | Meaney et al. | |
| 2013/0124998 A1 | 5/2013 | Pendergast et al. | |
| 2013/0124999 A1 | 5/2013 | Agnoli et al. | |
| 2013/0125000 A1 | 5/2013 | Fleischhauer et al. | |
| 2013/0177296 A1 | 7/2013 | Geisner et al. | |
| 2013/0212033 A1 | 8/2013 | Work et al. | |
| 2013/0212180 A1 | 8/2013 | Work et al. | |
| 2013/0216206 A1 | 8/2013 | Dubin et al. | |
| 2013/0218688 A1 | 8/2013 | Roos | |
| 2013/0222601 A1 | 8/2013 | Engstroem et al. | |
| 2013/0226578 A1 | 8/2013 | Bolton et al. | |
| 2013/0226674 A1* | 8/2013 | Field | G06Q 50/20 |
| | | | 705/7.38 |
| 2013/0226910 A1 | 8/2013 | Work et al. | |
| 2013/0254192 A1 | 9/2013 | Work et al. | |
| 2013/0259447 A1 | 10/2013 | Sathish et al. | |
| 2013/0266925 A1 | 10/2013 | Nunamaker, Jr. et al. | |
| 2013/0268452 A1 | 10/2013 | Macewen et al. | |
| 2013/0283378 A1* | 10/2013 | Costigan | G06F 21/55 |
| | | | 726/23 |
| 2013/0290210 A1 | 10/2013 | Cline et al. | |
| 2013/0290325 A1 | 10/2013 | Work et al. | |
| 2013/0290420 A1 | 10/2013 | Work et al. | |
| 2013/0290448 A1 | 10/2013 | Work et al. | |
| 2013/0297589 A1 | 11/2013 | Work et al. | |
| 2013/0332381 A1 | 12/2013 | Clark et al. | |
| 2013/0332382 A1 | 12/2013 | Lapasta et al. | |
| 2014/0036023 A1 | 2/2014 | Croen et al. | |
| 2014/0089217 A1 | 3/2014 | McGovern et al. | |
| 2014/0092254 A1 | 4/2014 | Mughal et al. | |
| 2014/0123177 A1 | 5/2014 | Kim et al. | |
| 2014/0125703 A1 | 5/2014 | Roveta et al. | |
| 2014/0143165 A1 | 5/2014 | Posse et al. | |
| 2014/0153902 A1 | 6/2014 | Pearson et al. | |
| 2014/0186004 A1 | 7/2014 | Hamer | |
| 2014/0191939 A1 | 7/2014 | Penn et al. | |
| 2014/0192200 A1 | 7/2014 | Zagron | |
| 2014/0198196 A1 | 7/2014 | Howard et al. | |
| 2014/0214709 A1* | 7/2014 | Greaney | G06Q 10/1053 |
| | | | 705/321 |
| 2014/0245146 A1 | 8/2014 | Roos | |
| 2014/0258288 A1 | 9/2014 | Work et al. | |
| 2014/0270706 A1 | 9/2014 | Pasko | |
| 2014/0278506 A1 | 9/2014 | Rogers et al. | |
| 2014/0278683 A1 | 9/2014 | Kennell et al. | |
| 2014/0279634 A1 | 9/2014 | Seeker | |
| 2014/0282709 A1 | 9/2014 | Hardy et al. | |
| 2014/0317009 A1 | 10/2014 | Bilodeau et al. | |
| 2014/0317126 A1 | 10/2014 | Work et al. | |
| 2014/0325359 A1 | 10/2014 | Vehovsky et al. | |
| 2014/0325373 A1 | 10/2014 | Kramer et al. | |
| 2014/0327779 A1 | 11/2014 | Eronen et al. | |
| 2014/0330734 A1 | 11/2014 | Sung et al. | |
| 2014/0336942 A1 | 11/2014 | Pe'er et al. | |
| 2014/0337900 A1 | 11/2014 | Hurley | |
| 2014/0356822 A1 | 12/2014 | Hoque et al. | |
| 2014/0358810 A1 | 12/2014 | Hardtke et al. | |
| 2014/0359439 A1* | 12/2014 | Lyren | G06F 16/951 |
| | | | 715/705 |
| 2015/0003603 A1 | 1/2015 | Odinak et al. | |
| 2015/0003605 A1 | 1/2015 | Odinak et al. | |
| 2015/0006422 A1 | 1/2015 | Carter et al. | |
| 2015/0012453 A1 | 1/2015 | Odinak et al. | |
| 2015/0046357 A1* | 2/2015 | Danson | G06Q 10/1053 |
| | | | 705/321 |
| 2015/0063775 A1 | 3/2015 | Nakamura et al. | |
| 2015/0067723 A1 | 3/2015 | Bloch et al. | |
| 2015/0099255 A1 | 4/2015 | Aslan et al. | |
| 2015/0100702 A1 | 4/2015 | Krishna et al. | |
| 2015/0127565 A1 | 5/2015 | Chevalier et al. | |
| 2015/0139601 A1 | 5/2015 | Mate et al. | |
| 2015/0154564 A1 | 6/2015 | Moon et al. | |
| 2015/0155001 A1 | 6/2015 | Kikugawa et al. | |
| 2015/0170303 A1 | 6/2015 | Geritz et al. | |
| 2015/0201134 A1 | 7/2015 | Carr et al. | |
| 2015/0205800 A1 | 7/2015 | Work et al. | |
| 2015/0205872 A1 | 7/2015 | Work et al. | |
| 2015/0206102 A1 | 7/2015 | Cama et al. | |
| 2015/0222815 A1 | 8/2015 | Wang et al. | |
| 2015/0228306 A1 | 8/2015 | Roberts et al. | |
| 2015/0242707 A1 | 8/2015 | Wilf et al. | |
| 2015/0269165 A1 | 9/2015 | Work et al. | |

(56) References Cited

U.S. PATENT DOCUMENTS

| | | | |
|---|---|---|---|
| 2015/0269529 A1* | 9/2015 | Kyllonen | G06Q 10/1053 705/321 |
| 2015/0269530 A1 | 9/2015 | Work et al. | |
| 2015/0271289 A1 | 9/2015 | Work et al. | |
| 2015/0278223 A1 | 10/2015 | Work et al. | |
| 2015/0278290 A1 | 10/2015 | Work et al. | |
| 2015/0278964 A1 | 10/2015 | Work et al. | |
| 2015/0324698 A1* | 11/2015 | Karaoguz | H04L 67/22 706/46 |
| 2015/0339939 A1 | 11/2015 | Gustafson et al. | |
| 2015/0356512 A1 | 12/2015 | Bradley | |
| 2015/0380052 A1 | 12/2015 | Hamer | |
| 2016/0005029 A1* | 1/2016 | Ivey | G09C 1/00 705/44 |
| 2016/0036976 A1 | 2/2016 | Odinak et al. | |
| 2016/0104096 A1 | 4/2016 | Ovick et al. | |
| 2016/0116827 A1 | 4/2016 | Tarres Bolos | |
| 2016/0117942 A1 | 4/2016 | Marino et al. | |
| 2016/0139562 A1 | 5/2016 | Crowder et al. | |
| 2016/0154883 A1 | 6/2016 | Boerner | |
| 2016/0155475 A1 | 6/2016 | Hamer | |
| 2016/0180234 A1 | 6/2016 | Siebach et al. | |
| 2016/0180883 A1 | 6/2016 | Hamer | |
| 2016/0219264 A1 | 7/2016 | Delvaux et al. | |
| 2016/0225409 A1 | 8/2016 | Eris | |
| 2016/0225410 A1 | 8/2016 | Lee et al. | |
| 2016/0247537 A1 | 8/2016 | Ricciardi | |
| 2016/0267436 A1 | 9/2016 | Silber et al. | |
| 2016/0313892 A1 | 10/2016 | Roos | |
| 2016/0323608 A1 | 11/2016 | Bloch et al. | |
| 2016/0330398 A1 | 11/2016 | Recchia et al. | |
| 2016/0364692 A1 | 12/2016 | Bhaskaran et al. | |
| 2017/0026667 A1 | 1/2017 | Pasko | |
| 2017/0039525 A1 | 2/2017 | Seidle et al. | |
| 2017/0076751 A9 | 3/2017 | Hamer | |
| 2017/0134776 A1 | 5/2017 | Ranjeet et al. | |
| 2017/0164013 A1 | 6/2017 | Abramov et al. | |
| 2017/0164014 A1 | 6/2017 | Abramov et al. | |
| 2017/0164015 A1 | 6/2017 | Abramov et al. | |
| 2017/0171602 A1 | 6/2017 | Qu | |
| 2017/0178688 A1 | 6/2017 | Ricciardi | |
| 2017/0195491 A1 | 7/2017 | Odinak et al. | |
| 2017/0206504 A1 | 7/2017 | Taylor et al. | |
| 2017/0213190 A1* | 7/2017 | Hazan | G06Q 10/1053 |
| 2017/0213573 A1 | 7/2017 | Takeshita et al. | |
| 2017/0227353 A1 | 8/2017 | Brunner | |
| 2017/0236073 A1 | 8/2017 | Borisyuk et al. | |
| 2017/0244894 A1 | 8/2017 | Aggarwal et al. | |
| 2017/0244984 A1 | 8/2017 | Aggarwal et al. | |
| 2017/0244991 A1 | 8/2017 | Aggarwal et al. | |
| 2017/0262706 A1 | 9/2017 | Sun et al. | |
| 2017/0264958 A1 | 9/2017 | Hutten | |
| 2017/0293413 A1 | 10/2017 | Matsushita et al. | |
| 2017/0316806 A1 | 11/2017 | Warren et al. | |
| 2017/0332044 A1 | 11/2017 | Marlow et al. | |
| 2017/0353769 A1 | 12/2017 | Husain et al. | |
| 2017/0372748 A1 | 12/2017 | Mccauley et al. | |
| 2018/0011621 A1 | 1/2018 | Roos | |
| 2018/0025303 A1 | 1/2018 | Janz | |
| 2018/0054641 A1 | 2/2018 | Hall et al. | |
| 2018/0070045 A1 | 3/2018 | Holmes | |
| 2018/0074681 A1 | 3/2018 | Roos | |
| 2018/0082238 A1 | 3/2018 | Shani | |
| 2018/0096307 A1 | 4/2018 | Fortier et al. | |
| 2018/0109737 A1 | 4/2018 | Nakamura et al. | |
| 2018/0109826 A1 | 4/2018 | Mccoy et al. | |
| 2018/0110460 A1 | 4/2018 | Danson et al. | |
| 2018/0114154 A1 | 4/2018 | Bae | |
| 2018/0130497 A1 | 5/2018 | Mccauley et al. | |
| 2018/0132014 A1 | 5/2018 | Khazanov et al. | |
| 2018/0150604 A1 | 5/2018 | Arena et al. | |
| 2018/0158027 A1 | 6/2018 | Venigalla | |
| 2018/0182436 A1 | 6/2018 | Ullrich | |
| 2018/0191955 A1 | 7/2018 | Aoki et al. | |
| 2018/0218238 A1 | 8/2018 | Viirre et al. | |
| 2018/0226102 A1 | 8/2018 | Roberts et al. | |
| 2018/0227501 A1 | 8/2018 | King | |
| 2018/0232751 A1 | 8/2018 | Terhark et al. | |
| 2018/0247271 A1 | 8/2018 | Van Hoang et al. | |
| 2018/0253697 A1 | 9/2018 | Sung et al. | |
| 2018/0268868 A1 | 9/2018 | Salokannel et al. | |
| 2018/0270613 A1 | 9/2018 | Park | |
| 2018/0302680 A1 | 10/2018 | Cormican | |
| 2018/0308521 A1 | 10/2018 | Iwamoto | |
| 2018/0316947 A1 | 11/2018 | Todd | |
| 2018/0336528 A1 | 11/2018 | Carpenter et al. | |
| 2018/0336930 A1 | 11/2018 | Takahashi | |
| 2018/0350405 A1 | 12/2018 | Marco et al. | |
| 2018/0353769 A1 | 12/2018 | Smith et al. | |
| 2018/0374251 A1 | 12/2018 | Mitchell et al. | |
| 2018/0376225 A1 | 12/2018 | Jones et al. | |
| 2019/0005373 A1 | 1/2019 | Nims et al. | |
| 2019/0019157 A1 | 1/2019 | Saha et al. | |
| 2019/0057356 A1 | 2/2019 | Larsen et al. | |
| 2019/0087558 A1 | 3/2019 | Mercury et al. | |
| 2019/0096307 A1 | 3/2019 | Liang et al. | |
| 2019/0141033 A1 | 5/2019 | Kaafar et al. | |
| 2019/0220824 A1 | 7/2019 | Liu | |
| 2019/0244176 A1 | 8/2019 | Chuang et al. | |
| 2019/0259002 A1 | 8/2019 | Balasia et al. | |
| 2019/0295040 A1 | 9/2019 | Clines | |
| 2019/0311488 A1 | 10/2019 | Sareen | |
| 2019/0325064 A1 | 10/2019 | Mathiesen et al. | |
| 2020/0012350 A1 | 1/2020 | Tay | |
| 2020/0110786 A1 | 4/2020 | Kim | |
| 2020/0126545 A1 | 4/2020 | Kakkar et al. | |
| 2020/0143329 A1 | 5/2020 | Gamaliel | |
| 2020/0311163 A1 | 10/2020 | Ma et al. | |
| 2020/0311682 A1 | 10/2020 | Olshansky | |
| 2020/0311953 A1 | 10/2020 | Olshansky | |
| 2020/0396376 A1 | 12/2020 | Olshansky | |
| 2021/0035047 A1 | 2/2021 | Mossoba et al. | |
| 2021/0174308 A1 | 6/2021 | Olshansky | |
| 2021/0233262 | 7/2021 | Olshansky | |

FOREIGN PATENT DOCUMENTS

| | | |
|---|---|---|
| CA | 2763634 | 12/2012 |
| CN | 109146430 | 1/2019 |
| EP | 1376584 | 1/2004 |
| EP | 1566748 | 8/2005 |
| EP | 1775949 | 12/2007 |
| EP | 1954041 | 8/2008 |
| JP | 2009258175 | 11/2009 |
| JP | 2019016192 | 1/2019 |
| WO | 9703366 | 1/1997 |
| WO | 9713366 | 4/1997 |
| WO | 9713367 | 4/1997 |
| WO | 9828908 | 7/1998 |
| WO | 9841978 | 9/1998 |
| WO | 9905865 | 2/1999 |
| WO | 0133421 | 5/2001 |
| WO | 0117250 | 9/2002 |
| WO | 03003725 | 1/2003 |
| WO | 2004062563 | 7/2004 |
| WO | 2005114377 | 12/2005 |
| WO | 2006103578 | 10/2006 |
| WO | 2006129496 | 12/2006 |
| WO | 2007039994 | 4/2007 |
| WO | 2007097218 | 8/2007 |
| WO | 2008029803 | 3/2008 |
| WO | 2008039407 | 4/2008 |
| WO | 2009042858 | 4/2009 |
| WO | 2009042900 | 4/2009 |
| WO | 2009075190 | 6/2009 |
| WO | 2009116955 | 9/2009 |
| WO | 2009157446 | 12/2009 |
| WO | 2010055624 | 5/2010 |
| WO | 2010116998 | 10/2010 |
| WO | 2011001180 | 1/2011 |
| WO | 2011007011 | 1/2011 |
| WO | 2011035419 | 3/2011 |
| WO | 2011129578 | 10/2011 |
| WO | 2011136571 | 11/2011 |

(56) References Cited

FOREIGN PATENT DOCUMENTS

| | | |
|---|---|---|
| WO | 2012002896 | 1/2012 |
| WO | 2012039959 | 6/2012 |
| WO | 2012089855 | 7/2012 |
| WO | 2013026095 | 2/2013 |
| WO | 2013039351 | 3/2013 |
| WO | 2013074207 | 5/2013 |
| WO | 2013088208 | 6/2013 |
| WO | 2013093176 | 6/2013 |
| WO | 2013131134 | 9/2013 |
| WO | 2013165923 | 11/2013 |
| WO | 2014089362 | 6/2014 |
| WO | 2014093668 | 6/2014 |
| WO | 2014152021 | 9/2014 |
| WO | 2014163283 | 10/2014 |
| WO | 2014164549 | 10/2014 |
| WO | 2015031946 | 4/2015 |
| WO | 2015071490 | 5/2015 |
| WO | 2015109290 | 7/2015 |
| WO | 2016031431 | 3/2016 |
| WO | 2016053522 | 4/2016 |
| WO | 2016073206 | 5/2016 |
| WO | 2016123057 | 8/2016 |
| WO | 2016138121 | 9/2016 |
| WO | 2016138161 | 9/2016 |
| WO | 2016186798 | 11/2016 |
| WO | 2016189348 | 12/2016 |
| WO | 2017022641 | 2/2017 |
| WO | 2017042831 | 3/2017 |
| WO | 2017049612 | 3/2017 |
| WO | 2017051063 | 3/2017 |
| WO | 2017096271 | 6/2017 |
| WO | 2017130810 | 8/2017 |
| WO | 2017150772 | 9/2017 |
| WO | 2017192125 | 11/2017 |
| WO | 2018042175 | 3/2018 |
| WO | 2018094443 | 5/2018 |
| WO | 2020198230 | 10/2020 |
| WO | 2020198240 | 10/2020 |
| WO | 2021108564 | 6/2021 |

OTHER PUBLICATIONS

File History for U.S. Appl. No. 16/366,703 downloaded Jan. 21, 2020 (425 pages).
"International Search Report and Written Opinion," for PCT Application No. PCT/US2020/024488 dated May 19, 2020 (14 pages).
"Non-Final Office Action," for U.S. Appl. No. 16/366,703 dated May 6, 2020 (65 pages).
"Notice of Allowance," for U.S. Appl. No. 16/366,746 dated Mar. 12, 2020 (40 pages).
"Response to Final Office Action," for U.S. Appl. No. 16/366,703, filed Feb. 18, 2020 (19 pages).
"International Search Report and Written Opinion," for PCT Application No. PCT/US2020/024470 dated Jul. 9, 2020 (13 pages).
"International Search Report and Written Opinion," for PCT Application No. PCT/US2020/024722 dated Jul. 10, 2020 (13 pages).
"Non-Final Office Action," for U.S. Appl. No. 16/828,578 dated Sep. 24, 2020 (39 pages).
"Notice of Allowance," for U.S. Appl. No. 16/366,703 dated Nov. 18, 2020 (19 pages).
Ramanarayanan, Vikram et al., "Evaluating Speech, Face, Emotion and Body Movement Time-series Features for Automated Multimodal Presentation Scoring," In Proceedings of the 2015 ACM on (ICMI 2015). Association for Computing Machinery, New York, NY, USA, 23-30 (8 pages).
"Response to Non Final Office Action," for U.S. Appl. No. 16/828,578, filed Dec. 22, 2020 (17 pages).
"Response to Non-Final Rejection," dated May 6, 2020 for U.S. Appl. No. 16/366,703, submitted via EFS-Web on Sep. 8, 2020, 25 pages.
"Air Canada Keeping Your Points Active Aeroplan," https://www.aircanada.com/us/en/aco/home/aeroplan/your-aeroplan/inactivity-policy.html, 6 pages.
"American Express Frequently Asked Question: Why were Membersip Rewards points forfeited and how can I reinstate them?," https://www.americanexpress.com/us/customer-service/faq.membership-rewards-points-forfeiture.html, 2 pages.
Brocardo, Marcelo L. et al., "Verifying Online User Identity using Stylometric Analysis for Short Messages," Journal of Networks, vol. 9, No. 12, Dec. 2014, pp. 3347-3355.
"International Search Report and Written Opinion," for PCT Application No. PCT/US2020/062246 dated Apr. 1, 2021 (18 pages).
Advantage Video Systems, "Jeffrey Stansfield of AVS interviews rep about Air-Hush products at the 2019 NAMM Expo," YouTube video, available at https://www.youtube.com/watch?v=nWzrM99qk_o, accessed Jan. 17, 2021.
"Final Office Action," for U.S. Appl. No. 16/828,578 dated Jan. 14, 2021 (27 pages).
"Invitation to Pay Additional Fees," for PCT Application No. PCT/US2020/062246 mailed Feb. 11, 2021 (14 pages).
"Non-Final Office Action," for U.S. Appl. No. 17/025,902 dated Jan. 29, 2021 (59 pages).
"Notice of Allowance," for U.S. Appl. No. 16/931,964 dated Feb. 2, 2021 (42 pages).
"International Search Report and Written Opinion," for PCT Application No. PCT/US2021/024423 dated Jun. 16, 2021 (13 pages).
"International Search Report and Written Opinion," for PCT Application No. PCT/US2021/024450 dated Jun. 4, 2021 (14 pages).
"Non-Final Office Action," for U.S. Appl. No. 16/910,986 dated Jun. 23, 2021 (70 pages).
"Notice of Allowance," for U.S. Appl. No. 17/025,902 dated May 11, 2021 (20 pages).
"Notice of Allowance," for U.S. Appl. No. 17/212,688 dated Jun. 9, 2021 (39 pages).
"Nurse Resumes," Post Job Free Resume Search Results for "nurse" available at URL <https://www.postjobfree.com/resumes?q=nurse&l=&radius=25> at least as early as Jan. 26, 2021 (2 pages).
"Nurse," LiveCareer Resume Search results available online at URL <https://www.livecareer.com/resume-search/search?jt=nurse> website published as early as Dec. 21, 2017 (4 pages).
"Response to Non Final Office Action," for U.S. Appl. No. 17/025,902, filed Apr. 28, 2021 (16 pages).
"Resume Database," Mighty Recruiter Resume Database available online at URL <https://www.mightyrecruiter.com/features/resume-database> at least as early as Sep. 4, 2017 (6 pages).
"Resume Library," Online job board available at Resume-library.com at least as early as Aug. 6, 2019 (6 pages).
"Television Studio," Wikipedia, Published Mar. 8, 2019 and retrieved May 27, 2021 from URL <https://en.wikipedia.org/w/index.php?title=Television_studio&oldid=886710983> (3 pages).
"Understanding Multi-Dimensionality in Vector Space Modeling," Pythonic Excursions article published Apr. 16, 2019, accessible at URL <https://aegis4048.github.io/understanding_multi-dimensionality_in_vector_space_modeling> (29 pages).
Alley, E. "Professional Autonomy in Video Relay Service Interpreting: Perceptions of American Sign Language-English Interpreters," (Order No. 10304259). Available from ProQuest Dissertations and Theses Professional. (Year: 2016), 209 pages.
Hughes, K. "Corporate Channels: How American Business and Industry Made Television Useful," (Order No. 10186420). Available from ProQuest Dissertations and Theses Professional. (Year: 2015), 499 pages.
Johnston, A. M, et al. "A Mediated Discourse Analysis of Immigration Gatekeeping Interviews," (Order No. 3093235). Available from ProQuest Dissertations and Theses Professional (Year: 2003), 262 pages.
Pentland, S. J. "Human-Analytics in Information Systems Research and Applications in Personnel Selection," (Order No. 10829600). Available from ProQuest Dissertations and Theses Professional. (Year: 2018), 158 pages.
Swanepoel, De Wet, et al. "A Systematic Review of Telehealth Applications in Audiology," Telemedicine and e-Health 16.2 (2010): 181-200 (20 pages).
Wang, Jenny "How to Build a Resume Recommender like the Applicant Tracking System (ATS)," Towards Data Science article published Jun. 25, 2020, accessible at URL <https://towardsdatascience.

(56) References Cited

OTHER PUBLICATIONS com/resume-screening-tool-resume-recommendation-engine-in-a-nutshell-53fcf6e6559b> (14 pages).

* cited by examiner

MULTI-CAMERA, MULTI-SENSOR PANEL DATA EXTRACTION SYSTEM AND METHOD

FIELD OF THE INVENTION

The present invention relates to a grouping of data from visual cameras, audio microphones, and behavior or depth sensors. More specifically, the present invention relates to the extraction of synched data for specific individuals from the created sensor data and to the identification of event data from that synched data.

SUMMARY

Various embodiments provide a system for extracting data from a plurality of sensors. The system can include one or more video cameras configured to record video input of the at least first participant and second participant in the panel discussion. The system can include one or more behavioral data sensors spatially oriented to record behavioral data input of at least a first participant and a second participant. The behavioral data sensors can be depth sensors configured to measure a distance between the depth sensor and a first participant. The behavioral data sensors can sense electromagnetic waves in the non-visible electromagnetic spectrum. The system can include one or more microphones configured to record audio input of the at least first participant and second participant in the panel discussion. The system can include a non-transitory computer memory storing a participant database. The participant database can include participant profiles for the at least first participant and second participant in the panel discussion. The system can include one or more computer processors in communication with the non-transitory computer memory. The one or more computer processors can be configured to receiving recorded video input from the one or more video cameras from at least the first participant and second participant in the panel discussion. The one or more computer processors can be configured to receive recorded behavioral data input from the one or more behavioral data sensors from the at least first participant and second participant in the panel discussion. The one or more computer processors can be configured to receive recorded audio input from the one or more microphones of the at least first participant and second participant in the panel discussion. The one or more computer processors can be configured to time synchronize the received recorded video input, the recorded behavioral data input, and the recorded audio input. The one or more computer processors can be configured to identify a first portion and a second portion of the time synchronized video input, behavioral data input, and audio input. The first portion is identified with the first participant and the second portion is identified with the second participant. The one or more computer processors can be configured to identify a first event in the first portion of the time synchronized video input, behavioral data input, and audio input. The one or more computer processors can be configured to identify a first participant profile associated with the first event, the first participant profile being assigned to the first participant in the panel discussion. The one or more computer processors can be configured to extract biometric behavioral data from a portion of the recorded behavioral data input associated with the first participant, wherein the extracted biometric behavioral data is associated with the first event. The one or more computer processors can be configured to store the extracted biometric behavioral data in the first participant profile.

In various embodiments, the one or more behavioral data sensors sense electromagnetic waves in the non-visible electromagnetic spectrum.

In various embodiments, the one or more behavioral data sensors are depth sensors, wherein each depth sensor is configured to measure a distance between the depth sensor and the first participant.

In various embodiments, the first participant is an employment candidate.

In various embodiments, the event is when the first participant is speaking, when the first participant is listening to another participant, when the first participant changes body posture, when a first participant is interrupted by another participant, or when a first participant interrupts another participant.

Various embodiments provide a system for evaluating participants in a panel discussion. The system can include one or more behavioral data sensors spatially oriented to capture behavioral data of participants in a panel discussion. The system can include one or more microphones configured to capture recorded audio of participant voices of the participants in the panel discussion. The system can include a non-transitory computer memory in communication with a computer processor; and computer instructions stored on the memory for instructing the processor. The computer instructions can instruct the processor to perform the step of receiving recorded audio input of the participant voices from the one or more microphones. The computer instructions can instruct the processor to perform the step of receiving first recorded behavioral data input from the one or more behavioral data sensors, the first recorded behavioral data input being associated with a first participant. The computer instructions can instruct the processor to perform the step of receiving second recorded behavioral data input from the one or more behavioral data sensors, the second recorded behavioral data input being associated with a second participant. The computer instructions can instruct the processor to perform the step of identifying a time synchronization between the first and second recorded behavioral data inputs and the recorded audio input. The computer instructions can instruct the processor to perform the step of identifying the first participant's voice in the recorded audio input. The computer instructions can instruct the processor to perform the step of identifying a first time segment of the recorded audio input as containing spoken content by the first participant. The computer instructions can instruct the processor to perform the step of identifying the second participant's voice in the recorded audio input. The computer instructions can instruct the processor to perform the step of identifying a second time segment of the recorded audio input as containing spoken content by the second participant. The computer instructions can instruct the processor to perform the step of in response to identifying the first time segment, extracting biometric behavioral data captured during the first time segment from the second recorded behavioral data input. The computer instructions can instruct the processor to perform the step of in response to identifying the second time segment, extracting biometric behavioral data captured during the second time segment from the first recorded behavioral data input.

In various embodiments, the one or more behavioral data sensors which sense electromagnetic waves in the non-visible electromagnetic spectrum.

In various embodiments, the one or more behavioral data sensors are depth sensors, wherein each depth sensor is configured to measure a distance between the depth sensor and one or more of the participants.

In various embodiments, the first participant is an employment candidate.

In various embodiments, the system can further include computer instructions stored on the memory for instructing the processor to perform the steps of associating an anonymized participant profile with the first participant, the anonymized participant profile being stored in a participant database in a non-transitory computer memory; associating an identified participant profile with the second participant, the identified participant profile being stored in the participant database; storing the extracted biometric behavioral data captured during the second time segment in the anonymized participant profile; and storing the extracted extracting biometric behavioral data captured during the first time segment in the identified participant profile.

Various embodiments provide a system for evaluating participants in a panel discussion. The system can include one or more behavioral data sensors spatially oriented to record behavioral data input of two or more participants in a panel discussion. The system can include one or more microphones configured to record audio input of the two or more participants in the panel discussion. The system can include a non-transitory computer memory storing a participant database, the participant database including participant profiles for the two or more participants in the panel discussion. The system can include one or more computer processors in communication with a non-transitory computer memory. The one or more processors can be configured to receive recorded behavioral data input from the one or more behavioral data sensors of the two or more participants in the panel discussion. The one or more processors can be configured to receive recorded audio input from the one or more microphones of the two or more participants in the panel discussion. The one or more processors can be configured to time synchronize the received recorded behavioral data and the recorded audio input. The one or more processors can be configured to associate a first portion of the recorded audio input with a first participant in the panel discussion. The one or more processors can be configured to extract spoken word data from the first portion of the recorded audio input using speech to text. The one or more processors can be configured to store the spoken word data in a participant profile for the first participant in the participant database. The one or more processors can be configured to associate a second portion of the recorded audio input with a second participant in the panel discussion. The one or more processors can be configured to associate a first portion of the recorded behavioral data input with the first participant. The one or more processors can be configured to associate a second portion of the recorded behavioral data input with the second participant. The one or more processors can be configured to identify a first time segment in the time synchronization corresponding to the first portion of the recorded audio input. The one or more processors can be configured to in response to identifying the first time segment, store behavioral data extracted from the second portion of the recorded behavioral data input in a participant profile for the second participant in the participant database. The one or more processors can be configured to identify a second time segment in the time synchronization corresponding to the second portion of the recorded audio input. The one or more processors can be configured to in response to identifying the second time segment, store behavioral data extracted from the first portion of the recorded behavioral data input in the participant profile for the first participant.

In various embodiments, the one or more behavioral data sensors which sense electromagnetic waves in the non-visible electromagnetic spectrum.

In various embodiments, the one or more behavioral data sensors are depth sensors, wherein each depth sensor is configured to measure a distance between the depth sensor and one or more of the participants.

In various embodiments, the first participant is an employment candidate.

In various embodiments, the participant profile for the first participant is an identified profile, and the participant profile for the second participant is an anonymized profile.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

DETAILED DESCRIPTION

Overall System

Figure 1:
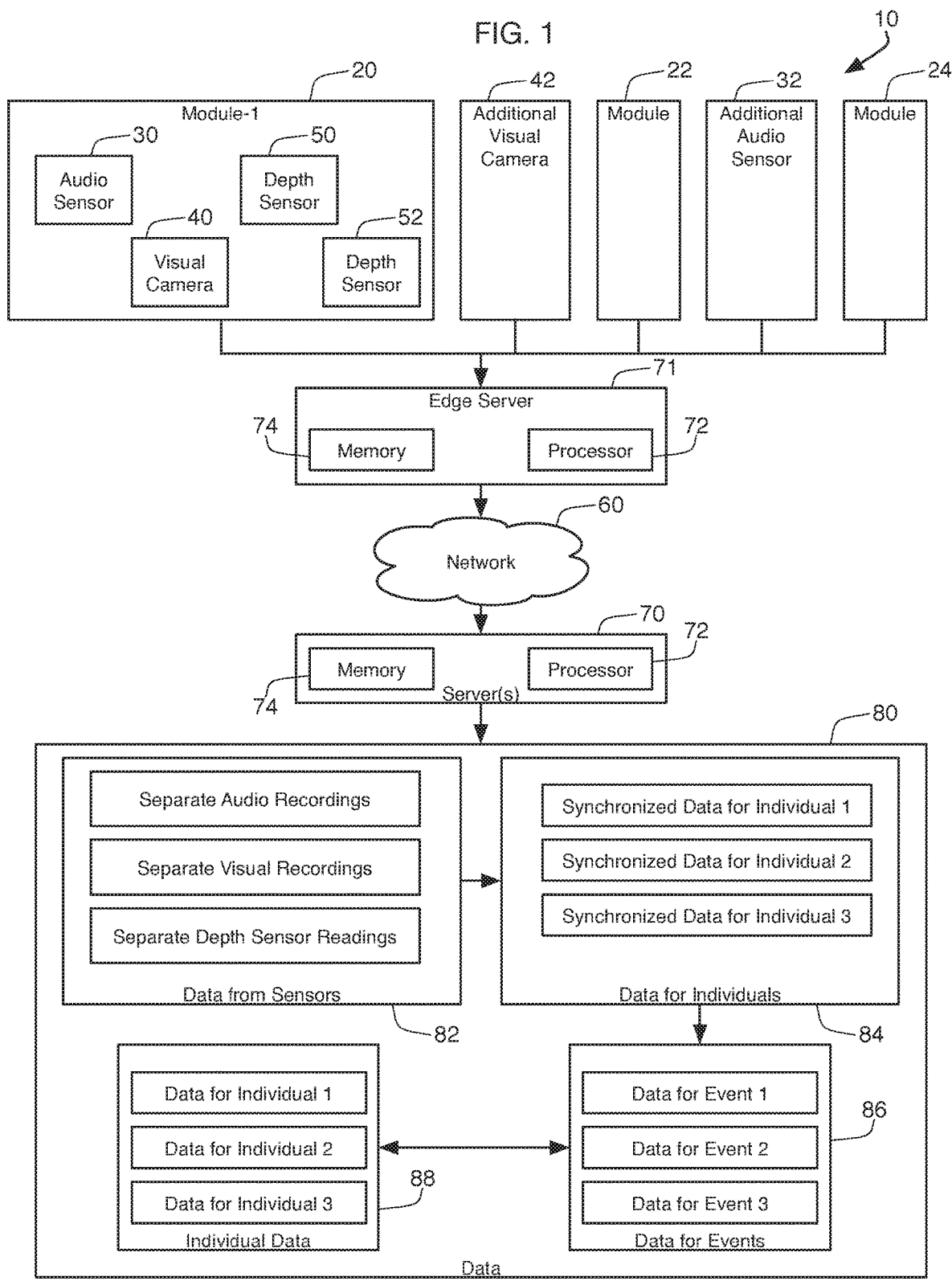
FIG. 1 shows a schematic representation of depth sensors, visual cameras, and audio recording sensors linked with one or more servers for data extraction.

FIG. 1 reveals the technical difficulties encountered and solved by the disclosed embodiments in the present application. A system 10 is designed to record and sense multiple individuals. These individuals can form a panel, meaning that the video and audio recordings and other sensor readings acquired by the system 10 relate to individuals interacting with each other. In one embodiment, the system 10 uses sensor modules 20 that incorporate multiple different types of sensors. In FIG. 1, module-1 20 is shown with an audio sensor or microphone 30 to make sound recordings, a visual camera 40 to make visual recordings, and two behavioral or depth sensors 50, 52 to record and more easily identify the physical movements of the individuals. In system 10, two additional modules 22, 24 are also present. Although this is not shown in FIG. 1, these additional modules 22, 24 can contain the same cameras, recording devices, and sensors 30, 40, 50, 52 as module-1 20.

The system 10 also includes an additional visual camera 42 and an additional audio sensor 32. These elements 32, 42 are not part of the modules 20, 22, 24. In one embodiment, each module 20, 22, 24 and be focused on a different individual. In other embodiments, there are two, three, four, or more individuals being recorded than the number of modules 20, 22, 24. The additional visual camera 40 and audio sensors 32 are designed to increase the coverage of the recorded audio and visual data. In still further embodiments, each audio sensor 30, 32, visual camera 40, 42, and behavioral or depth sensor 50, 52 monitors multiple individuals.

In FIG. 1, the camera, modules, and sensors 20-52 are in data communication with one or more servers 70 (which is generally referred to as a single server 70 in this description). This data communication can flow over a network 60, such as a wired or wireless local area network or even a wide area network such as the Internet.

In the embodiment shown in FIG. 1, the cameras, modules, and sensors 20-52 first communicate with an edge server 71, which in turn is responsible for communications with the servers 70 over the network 60. An edge server 71 provides local processing power and control over the cameras, modules, and sensors 20-52. In some circumstances, the edge server 71 can provide control interfaces to aim and adjust the settings of the cameras, modules, and sensors 20-52. In other circumstances, the edge server 71 can provide tracking capabilities for the cameras, modules, and sensors 20-52. For example, the visual cameras 40, 42 may include a motorized mount that allows for the identification and tracking of human faces, with the edge server 71 providing the processing programming and power necessary to both identify and track those faces. In still further embodiments, the edge server 71 is responsible taking input from the modules 20, 22, 24 and creating audiovisual output with a variety of camera angles. While FIG. 1 is shown with the edge server 71 providing communications over the network 60 with the server 70, in other embodiments the jobs and capabilities of the edge server 71 are provided by the server 70 and no edge server 71 is needed. Also, capabilities that are described herein as being performed by the server 70 can, alternatively, or in addition, be performed by the edge server 71.

The server 70 and the edge server 71 are both computing devices that each a processor 72 for processing computer programming instructions. In most cases, the processor 72 is a CPU, such as the CPU devices created by Intel Corporation (Santa Clara, Calif.), Advanced Micro Devices, Inc (Santa Clara, Calif.), or a RISC processor produced according to the designs of Arm Holdings PLC (Cambridge, England). Furthermore, the server 70 and edge server 71 has memory 74 which generally takes the form of both temporary, random access memory (RAM) and more permanent storage such a magnetic disk storage, FLASH memory, or another non-transitory (also referred to as permanent) storage medium. The memory and storage component 74 (referred to as "memory" 74) contains both programming instructions and data. In practice, both programming and data will generally be stored permanently on non-transitory storage devices and transferred into RAM when needed for processing or analysis.

In FIG. 1, data 80 is shown as existing outside of the server 70. This data 80 can be structured and stored as a traditional relational database, as an object-oriented database, or as a key-value data store. The data 80 can be directly accessed and managed by the server 70, or a separate database management computer system (not shown) can be relied upon to manage the data 80 on behalf of the server 70.

The separate camera recordings and sensed data from the sensors 22-52 are stored as sensor data 82. In one embodiment, the data acquired from each camera, microphone and sensor 22-52 is stored as separate data 82. As explained below, it is necessary to identify data from the sensors that relate to a single individual in a panel. To accomplished this, data associated from the sensors 22-52 must be synchronized and analyzed in order to extract that data that is associated for a single individual. The resulting data is shown as data for individuals 84 in FIG. 1. The transition from sensor data 82 to individual data 84 becomes more difficult when one sensor, such as additional visual camera 42, is used to record multiple individuals, or when multiple sensors, such as the two depth sensors 50, 52, record different portions of a single individual.

As is also described in further detail below, the data for individuals 84 must be analyzed in order to identify events that relate to multiple individuals. Data created for the identified events is shown as data for events 86 in FIG. 1. Each event might relate to audio, visual, or 3-D sensor data for multiple individuals. With proper analysis, data about the interaction between these multiple individuals can be saved as data 86. This event data 86 is associated with specifically identified individuals. As a result, the event data 86 can be separately stored with data that is maintained on each of the individuals being monitored by system 10, which is shown as individual data 88 in FIG. 1.

In other words, system 10 is designed to acquire sensor data 82 from a plurality of cameras, microphones, and sensors 20-52 concerning multiple individuals, and then use this sensor data 82 to identify data relating to specific individuals 84. This data for individuals 84 describes the actions of each individual as recorded by the multiple sensors 20-52. From this data 84, it is possible to generate data describing specific events 86 that involved multiple individuals. This event data 86 can then be used to create relevant additional data 88 describing the individuals being monitored.

Possible Use of System 10

The system 10 can be used, for example in a panel interview setting where more than one individual is present and actively participating in the interview. In one example, a group of individuals are seated in a room for a panel discussion. Multiple cameras 40, 42 are positioned to record video images of the individuals. Multiple behavioral sensors such as depth sensors 50, 52 are positioned to record quantitative behavioral data of the individuals. Multiple microphones 30, 32 are positioned to record the voices of the participants. In some examples, the group of individuals includes at least one candidate for a job opening. In some examples, the group of individuals includes one or more potential future co-workers of the candidate. In some examples, multiple panel interviews are performed. In some examples, a panel interview includes one job candidate and two or more potential future co-workers. In some examples, a job candidate participates in two or more panel interviews with different groups of future co-workers. In some examples, each panel interview includes two or more job candidates. Throughout the description, analysis of candidates and participants will be described, and the terms candidates and participant can be substituted for each other, except where there is an analysis needed of candidates vs. non-candidates.

In one example, a participant profile database 88 is provided. The database is pre-populated with profiles for known participants before the interviews are conducted. For example, each participant can provide personally identifying information in advance, such as a name, resume, job title, and description. While the panel interview is conducted, each participant will be recorded with one or more sensors 20-52. For example, one or more cameras 40, 42 can focus on the facial expression of the participant. In addition, or alternatively, one or more sensors 20-52 can focus on the body posture of the participant. One or more sensors 20-52 can focus on the hands and arms of the participants. The system 10 can evaluate the behavior of one or more participants in the discussion. The system 10 can calculate a score for one or more participants in the discussion. If the participant is a job candidate, then the system 10 can calculate a score for the candidate to assess their suitability for an open job position. If the participant is an employee, the system 10 can calculate a participation score. The system 10 can assess the participant's strengths and weaknesses and provide feedback on ways the participant can improve performance in discussions or in a skill. The system 10 can observe and describe personality traits that can be measured by physical movements.

The system 10 can compute a participation score for individuals based on an evaluation of the individual's body posture, facial expression, voice characteristics, spoken word content, and contextual and domain knowledge data points.

In some examples, the system 10 can be described as a group discussion: A question is posed, and then multiple individuals answer the question in a roundtable discussion style. Audio, video, and behavioral data are recorded during the session. When a participant is talking, the system 10 extracts keywords from the participant's speech using a speech to text software module. When the participant is listening to other people speaking, the system 10 monitors the participant's behavioral data, such as eye gaze and body posture. The system 10 performs these features for each person involved in the discussion.

Different opportunities for evaluating participants are available when the participants are part of multiple panel interviews. However, the system is capable of evaluating participants that only are present in one panel interview.

Individuals in the group are evaluated based on their interactions with other group members. For example, when one individual is speaking, a listener in the group can be evaluated using quantitative behavioral data recorded of the listener to determine whether the listener was being attentive to the speaker. This type of interaction between individuals can be considered an event, and data is stored in the data for events 86. As another example, two individuals engaged in back-and-forth conversation can be evaluated for whether they project a positive attitude or negative attitude toward the other speaker.

In some examples, each discussion participant is evaluated based on multiple types of behaviors and interactions. Participants can also be evaluated based on the quality of their input in the discussion, such as the depth of information communicated during the discussion. Natural language processing can be used to evaluate the substance of a speaker's comments.

Each discussion participant can be evaluated while they are speaking. Each discussion participant can also be evaluated while they observe others speaking. This provides insight into the level of participation of each person in the discussion, the suitability of the individuals to work together as a team, and the engagement or attention of each person to the others in the room. Other insights include how well each individual participant fits into the group, and whether the participants are likely to work well together as a group.

Based on the evaluations of each participant, or of each participant of a subgroup of the participants, the group as a whole can be evaluated. One example of a subgroup that might be analyzed is the group of current employees in the discussion. Analysis of this subgroup can shed light on the company's culture, strengths, and challenges. Positive and negative actions by single individuals or interactions between multiple individuals can be flagged for evaluation.

The system uses a keyword set compiled from text extracted from the audio input of each of the participants. The compiled keyword set enables an evaluation of the substance of the panel discussion. Each individual participant can be evaluated based on the keywords used by that particular participant in relation to the entire compiled keyword set across all individuals in the panel.

In some cases, a participant will only have a short answer, such as agreeing with another participant. In the context of the discussion, the system can flag this interaction/event as being a positive interaction in which the speaker plays well with the rest of the team. In other cases, a participant may have a very long answer in which the participant speaks at length about a topic. Very long answers and very short answers may potentially skew results of the analysis. To compensate for situations in which a participant has a very long answer or a very short answer, the system can evaluate each participant's best responses. The best responses can be chosen based on many different criteria. For example, best responses can be selected based on the density of high-quality keywords the speaker produces while answering the questions. The disclosure herein the individual data 88 forms part of a participant database system for analyzing and evaluating individual participants involved in a panel, and for evaluating the group as a whole based on positive or negative interpersonal events detected during the group discussion.

In some examples, one or more digital profiles are established in a profile database ahead of a group interaction. One or more participants in the panel may be associated with digital profiles in the profile database.

In some examples, the system 10 distinguishes between different individual voices in one or more recorded audio streams. 82 Each voice is associated with a profile in the individual data 88. In some examples, each individual participating in the panel can have a preexisting profile in the participant database. In alternative examples, the database can create new profiles for voices identified but not recognized in the audio tracks 82. In some examples, the profiles can be personally identifying for some or all of the participants in the panel discussion. In alternative examples, the profiles can be anonymized for some or all of the participants. In some examples, participants are evaluated based on a response to a stimulus. In these examples, the participant being evaluated can be personally identified, even when their behavior is being evaluated based on an interaction with a participant who is anonymized.

The system 10 is designed to evaluate participant behavior during a panel interaction (such as a panel interview). A panel discussion is an interaction between two or more participants. One example of a panel discussion is a job interview where a candidate for a company is being interviewed by two or more employees of the company. The term "panel interview" or "panel discussion" as it is used herein encompasses interactions between and discussions among two or more people, even if not in the context of a job interview. One such example of a panel interview is a group discussion of an issue of shared interest. Within the context of a workplace, a panel discussion could be a group discussion of a shared goal, a shared challenge, a facilities decision, or an information technology decision, such as a new software tool that is being considered for adoption.

The system provides evaluation modules that use recorded data as input. In the various examples herein, "recorded data" refers only to data that was recorded during the panel discussion, such as data 82. Recorded data can be recorded audio data, recorded video data, and/or recorded behavioral sensor data. Recorded data can mean the raw data received from a sensor 20-52, or it can be data converted into a file format that can be stored on a memory and later retrieved for analysis.

The evaluation modules also use extracted data as input. As used herein, "extracted data" is information that is extracted from raw data of the recorded audio, recorded video, or recorded behavioral sensor data. For example, extracted data can include keywords extracted from the recorded audio using speech to text software. Extracted data can also include body posture data extracted from the behavioral sensor data, or eye-movement data extracted from the recorded video. Other examples are possible and are within the scope of the technology.

The evaluation modules can also use external data as input. "External data," as used herein, is data other than that recorded during the panel discussion. External data can refer to audio data, video data, and/or behavioral sensor data that was recorded at some time other than during the panel discussion. External data also can refer to text data imported from sources external to the panel discussion. In the context of an interview, for example, the external data may include resumes, job descriptions, aptitude tests, government documents, company mission statements, and job advertisements. Other forms of external data are possible and are within the scope of the technology.

The system 10 is capable of storing data in a database structure. As used herein, "stored data" refers to data that is stored in at least one database structure in a non-volatile computer storage memory 74 such as a hard disk drive (HDD) or a solid-state drive (SSD). Recorded data, extracted data, and external data can each be stored data when converted into a format suitable for storage in a non-volatile memory 74.

In some examples, the system 10 analyzes recorded audio data, recorded video data, and recorded behavioral sensor data for each individual in the panel discussion (data 84) to identify events (data 86) that may be related to the evaluation modules. This analysis may be conducted as the raw data is being recorded, or the recorded data may be stored in a memory for later analysis.

System for Recording Panel Discussions

Figure 2:
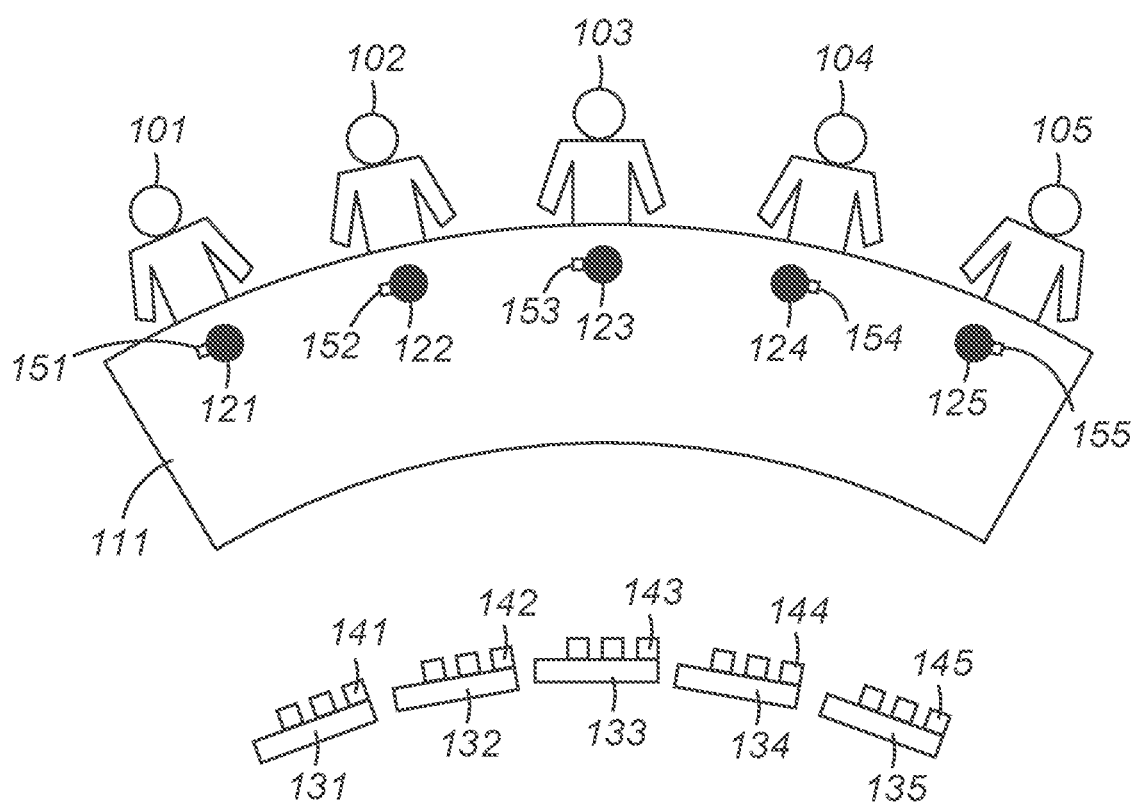
FIG. 2 shows an example room set up of a system for recording panel discussions.

FIG. 2 shows an example room set up of a system for recording panel discussions. A group of participants 101, 102, 103, 104, and 105 are situated in a room. In the example shown FIG. 2, the participants are seated at a table 111. In this example, each participant is provided a microphone 121, 122, 123, 124, 125. Multiple digital video cameras 131, 132, 133, 134, and 135 are positioned in the space to record video of each participant. Multiple additional sensors 151, 152, 153, 154, 155 can be positioned near or around the participants, such as attaching one additional sensor to each housing for the microphones 121, 122, 123, 124, 125. In an example, the additional sensors can take the form of an IR sensor, a second video camera, or a motion sensor.

In some examples, each of the digital video cameras 131, 132, 133, 134, and 135 includes a behavioral data sensor, which can be a sensor that senses electromagnetic waves in the non-visible electromagnetic spectrum. For example, the behavioral data sensors can be depth sensors that emit and detect electromagnetic waves in the infrared or near-infrared spectrum.

For example, an infrared sensor can be used to sense data corresponding to the individual's body movements, gestures, or facial expressions. Behavioral data can be extracted from the sensor data input to determine additional information about the candidate's body language when reacting to or interacting with other discussion participants. A microphone can provide behavioral data input, and the speech recorded by the microphone can be extracted for behavioral data, such as vocal pitch and vocal tone, word patterns, word frequencies, and other information conveyed in the speaker's voice and speech.

In some examples, multiple sensors can monitor a single participant, such as at least two sensors for each individual. In some examples, the system can include at least three, four, five, six, seven, eight, nine, ten, or more sensors to monitor each participant. In some examples, the multiple sensors can be arranged at various positions relative to the participants, such as a sensor directly in front of a participant, a sensor behind a participant, a sensor below a participant, a sensor above a participant, a sensor behind a participant, and/or a sensor to one or both sides of a participant. In some examples the sensor can be adjacent to a microphone, such as on a microphone stand. Various sensor arrangements can include two or more of the listed possible sensor locations.

In some examples, two or more sensors can be located in the same housing. In some examples, two sensors can be arranged with one sensor above the other sensor. In some examples, two sensors can be located at different distances from the participant. In some examples, two sensors can be equal distances away from the participant. In some examples, the two sensors can be arranged with one sensor in front of the other sensor, such that one sensor is closer to the participant than the other sensor. In some examples, two sensors can be arranged side by side, such that the sensors are at different angles to the participant. In some examples, one sensor can be positioned in front of a participant and a second sensor can be positioned near the participant, such as shown in FIG. 2 with digital video cameras 131, 132, 133, 134, and 135 positioned in front of the participants, and additional sensors 151, 152, 153, 154, 155 on a microphone 121, 122, 123, 124, 125.

Figure 3:
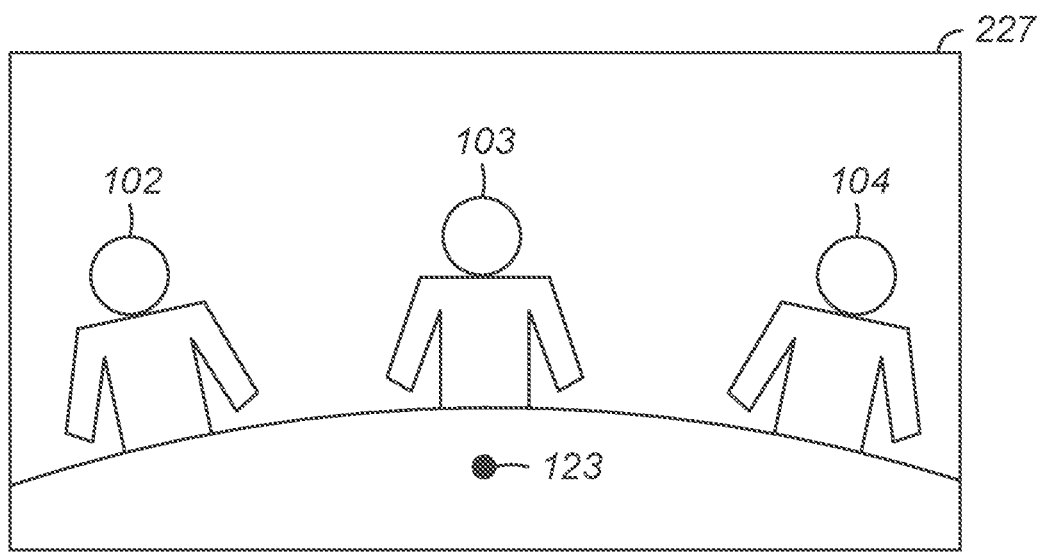
FIG. 3 shows an example of a single frame of an image recorded by a digital video camera such as those in FIG. 1.

FIG. 3 shows an example of a single frame 227 of an image recorded by a digital video camera such as those in FIG. 2. For example, the frame 227 can show the individuals 102, 103, 104. The frame 227 also includes an image of the microphone 123. In some examples, the frame 227 can be linked to a grid of pixels of data sensed by a depth sensor. The pixel data can be parsed to extract data about the individual 103 in the frame. For example, the system can determine that the top of the individual's head is approximately in the center of the frame. The system can identify that the microphone 123 is assigned to the individual 103. Data streams from the microphone 123, video camera 133, and behavioral data sensor 143 can all automatically be associated with a participant profile for the individual 103 in the participant database.

In some examples, at least one of the participants is a candidate for employment. In some examples, the other individuals participating in the panel interview are interviewers such as hiring managers, or the other individuals can be employees of the company that is hiring. In some examples, one or more of the participants is a potential future coworker of the candidate. In some examples, two or more of the participants are candidates for employment. Alternatively, the panel interview can be composed entirely of job candidates.

In some examples, the system is provided with a server for processing the inputs from the cameras, microphones, and behavioral data sensors. The server includes a processor and storage memory accessible by the processor. In some cases, the server can be located physically near the cameras, microphones, and behavioral data sensors. In alternative examples, the server can be a remote server to which the video, audio, and behavioral data can be sent over a network connection. In some examples, processing of the data input occurs at a local server. This could include extracting behavioral data from the raw sensor data received from the behavioral data sensors. In some alternative examples, the system transmits the data for analysis to a remote server.

In some examples, each individual participant is provided with one microphone, one video camera, and one or more behavioral data sensors, each of which is position primarily on the individual to record data of that single individual, as shown in FIG. 2. In these examples, the data streams output from the microphone, video camera, and behavioral data sensors for that individual can associated with the individual's profile in the profile database during a set-up process for the discussion.

In some examples, even when participants are assigned to a single camera, microphone, or sensor, data from other participants may be recorded. For example, if an audio microphone is sufficiently sensitive, it will pick up voices from more than one person in the room, even if that microphone is intended to only record audio input from a single person. In these cases, system hardware or software can filter out the undesired audio portions, leaving only the desired data input for the single individual.

In some examples, each digital video camera has a sensor capable of recording body movement, gestures, or facial expression. In some examples, the sensors can be infrared sensors such as depth sensors for motion sensors. A system with multiple depth sensors can be used to generate 3D models of the individual's movement. An infrared sensor emits infrared light and detects infrared light that is reflected. In some examples, the infrared sensor captures an image that is 1,024 pixels wide and 1,024 pixels high. Each pixel detected by the infrared sensor has an X, Y, and Z coordinate, but the pixel output is actually on a projection pane represented as a point (X, Y, 1). The value for Z (the depth, or distance from the sensor to the object reflecting light) can be calculated or mapped.

For example, the system can analyze the individual's body posture by compiling data from three behavioral data sensors. This body posture data can then be used to extrapolate information about the individual's behavior in reaction or interaction with other individuals during the panel discussion, such as whether the individual was reserved or outgoing, or whether the individual was speaking passionately about a particular subject.

Figure 8:
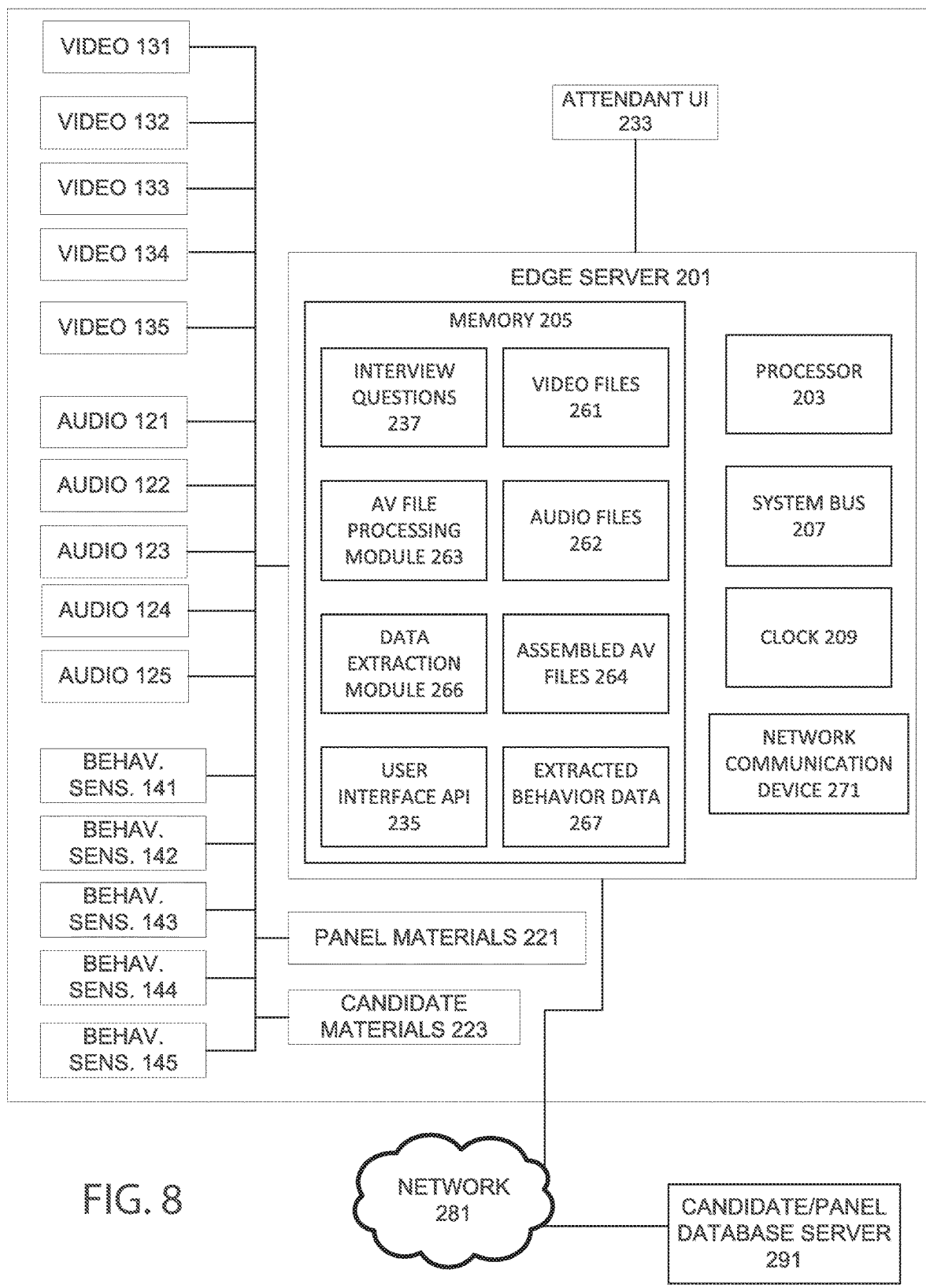
FIG. 8 is a schematic view of a panel discussion environment according to some examples.

FIG. 8 shows a schematic diagram of one example of a panel environment 700. The panel environment 700 includes an edge server 201 that has a computer processor 203, a system bus 207, a system clock 209, and a non-transitory computer memory 205. The edge server 201 is configured to receive input from the video and audio devices of the environment and process the received inputs.

In various examples, the panel environment 700 will be set up at a location conducive to a group discussion with sufficient room for the recording equipment. Examples of possible locations include a conference room at a company or meeting facility, or a lecture hall at a college campus.

The panel environment 700 can include an attendant user interface 233. The attendant user interface 233 can be used, for example, to check in users, or to enter data about the users. The attendant user interface 233 can be used to turn cameras, behavioral data sensor, or microphones on or off if there is a change in the expected attendees after physical set-up. The attendant user interface 233 can be provided with a user interface application program interface (API) 235 stored in the memory 205 and executed by the processor 203. The user interface API 235 can access particular data stored in the memory 205, such as interview questions 237. The interview questions 237 can be displayed to the panel members on an optional user interface, which is not illustrated.

The system includes multiple types of data inputs. FIGS. 2 and 8 show a physical set up for five individuals participating on the panel discussion, with a video camera, microphone, and behavioral data sensor provided for each participant. The system may have other numbers of video cameras, microphones, and behavioral data sensors, such as at least two, at least three, and at least four. In the example of FIG. 8, the five video camera devices 131, 132, 133, 134 and 135 each produce video input which is stored on memory 205 in the video files 261 in the edge server 201. Each video camera device 131, 132, 133, 134 and 135 can include a variety of cameras, such as cameras with a variety of scope or a particular direction, so that more information can be gathered about the participants. In one embodiment, each video camera device 131, 132, 133, 134 and 135 includes a wide-angle camera and a close-up camera. In one embodiment, each video camera device 131, 132, 133, 134 and 135 includes a high angle camera and a low angle camera.

In the example of FIG. 8, the five microphones 121, 122, 124, and 125 produce audio input 262 stored on memory 205 in the edge server 201. The system also receives behavioral data input from behavioral sensors 141, 142, 143, 144, and 145. The behavioral data input can be from a variety of different sources. In some examples, the behavioral data input is a portion of data received from one or more of the cameras 131, 132, 133, 134 and 135. In other words, the system receives video data and uses it as the behavioral data input. In some examples, the behavioral data input 267 is a portion of data received from one or more microphones. In some examples, the behavioral data input is sensor data from one or more infrared sensors provided on the cameras 131, 132, 133, 134 and 135. The system can also receive text data input that can include text related to a candidate on the panel, and candidate materials 223 that can include materials related to the individual's job candidacy, such as a resume or text from questions that the candidate has answered. The system can also receive panel materials 221 to provide information about the make-up of the panel members. The panel materials 221 can include text with notes on company culture, keywords related to the company's industry and business, the company's mission statement, and special skills or certifications that are sought by the company.

In some examples, the video inputs are stored in the memory 205 of the edge server 201 as video files 261. In alternative examples, the video inputs are processed by the processor 203, but are not stored separately. In some examples, the audio input is stored as audio files 262. In alternative examples, the audio input is not stored separately.

The panel materials 221, candidate materials input 223, and behavioral data input 267 can also be optionally stored or not stored as desired.

In some examples, the edge server 201 further includes a network communication device 271 that enables the edge server 201 to communicate with a remote network 281. This enables data that is received and/or processed at the edge server 201 to be transferred over the network 281 to a candidate database server 291.

The edge server 201 includes computer instructions stored on the memory 205 to perform particular methods. The computer instructions can be stored as software modules. The system can include an audiovisual file processing module 263 for processing received audio and video inputs and assembling the inputs into audiovisual files and storing the assembled audiovisual files 264. The system can include a data extraction module 266 that can receive one or more of the data inputs (video inputs, audio input, behavioral input, etc.) and extract behavior data 267 from the inputs and store the extracted behavior data 267 in the memory 205.

Additional hardware and software options for the system described herein are shown and described in commonly owned, co-pending U.S. patent application Ser. No. 16/366,746, titled Automatic Camera Angle Switching to Create Combined Audiovisual File, filed on Mar. 27, 2019, which is incorporated herein by reference in its entirety.

Figure 4:
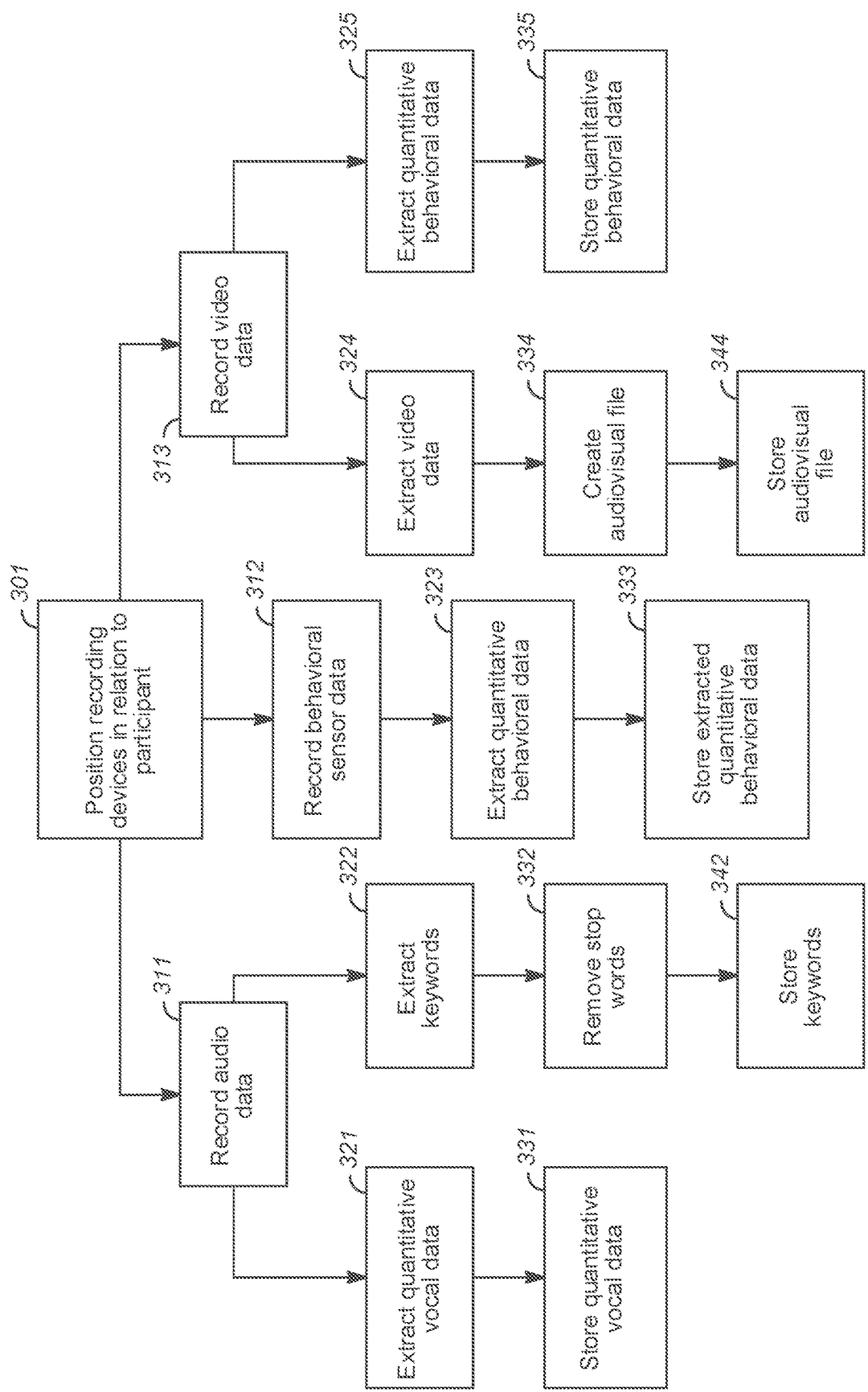
FIG. 4 is a flowchart showing a method of recording participant data for a participant in a panel discussion.

Data Streams from Panel Recordings (FIG. 4)

FIG. 4 is a flowchart showing a method of recording participant data for a participant in a panel discussion. The method can be performed for each participant in a panel discussion such as that conducted in relation to the system of FIG. 2. In step 301, recording devices are positioned in relation to a participant. For example, referring to FIG. 2, a microphone 121 and a video camera 131 having a video data sensor and a behavioral data sensor are positioned in relation to participant 101 such that each of the sensors can record audio, video, and behavioral data of the participant 101. Similarly, the microphones 122, 123, 124, and 125 and video cameras 132, 133, 134, and 135 are positioned in relation to the participants 102, 103, 104, and 105.

The method of the flowchart in FIG. 4 will now be described in relation to participant 101. It should be understood that the method can be performed in a substantially similar manner for participants 102, 103, 104, and 105.

In step 301, multiple participants are positioned in front of recording devices, such as microphones, video cameras, and behavioral data sensors. In step 311, audio data of the individual 101 is recorded by a microphone 121. Behavioral sensor data of the individual 101 is recorded at step 312. The recording can be performed by a depth sensor that is part of the video camera 131. At step 313, video data of the individual 101 is recorded by video camera 131.

The audio data recorded in step 311 goes through two flow processes. In one process, quantitative vocal data is extracted from the recorded audio data at step 321. The quantitative vocal data can be related to sounds recorded in the audio other than the actual content of the spoken words. For example, the quantitative vocal data can be related to voice pitch, voice tone, speech cadence, speech volume, a length of time speaking, or other similar qualities other than the content of the speech. In a second process, at step 331, the quantitative vocal data that was extracted from the recorded audio data is stored in a non-transitory computer memory for later processing. In some examples, the participant 101 has a participant profile in a profile database that is pre-associated with the audio data recorded in step 311. For example, if microphone 121 is dedicated exclusively to recording the voice of participant 101, the system can be configured such that a profile for participant 101 can be provided in a participant database and the recorded audio data 311 can be automatically associated with that profile.

In alternative examples, audio data recorded at step 311 is not associated with an identified individual. In this case, the system can create a new participant profile. This new participant profile can initially be anonymized. Optionally, an anonymized profile can later be linked to an identity for a participant.

In a second process flow, keywords are extracted from the recorded audio data at step 322. In some examples, the full text of an audio recording of a participant's speech can be extracted using a speech to text software module. At step 332, stop words are removed from the extracted keywords. As used herein, a "stop word" is a part of speech that does not convey substance. For example, the words "the," "a," and "is" are necessary for grammar, but do not convey substantive meaning. Stop words are removed from the list of extracted keywords. In step 342, the remaining keywords are stored in the participant profile.

Turning now to the behavioral data process flow, after behavioral sensor data is recorded at step 312, quantitative behavioral data is extracted from the behavioral sensor data at step 323. For example, data related to a person's head and torso movement can be extracted from raw sensor data of a depth sensor. Other types of quantitative behavioral data that can be extracted from behavioral sensor data are described in U.S. patent application Ser. No. 16/366,703, filed Mar. 27, 2019 and entitled Employment Candidate Empathy Scoring System, the entirety of which is herein incorporated by reference. At step 333, extracted quantitative behavioral data is stored in the participant profile.

At a further process flow, video images are extracted at step 324 from the recorded video data. At step 334, the video data is combined with audio data recorded at step 311 to create a combined audiovisual file containing both video data and audio data. The video data and audio data can be time synchronized. In audiovisual file is stored in the participant profile, step 344.

In step 325, quantitative behavioral data is extracted from the recorded video data from step 313. For example, individual still video frames recorded by a digital video camera 131 may contain image data related to an individual's eye movement, mouth movement, etc. This quantitative data can include measurements of distances or shapes of objects in the video frame. These measurements and shapes can be stored as quantitative behavioral data in step 335. Other examples are possible and will be described below.

Figure 5:
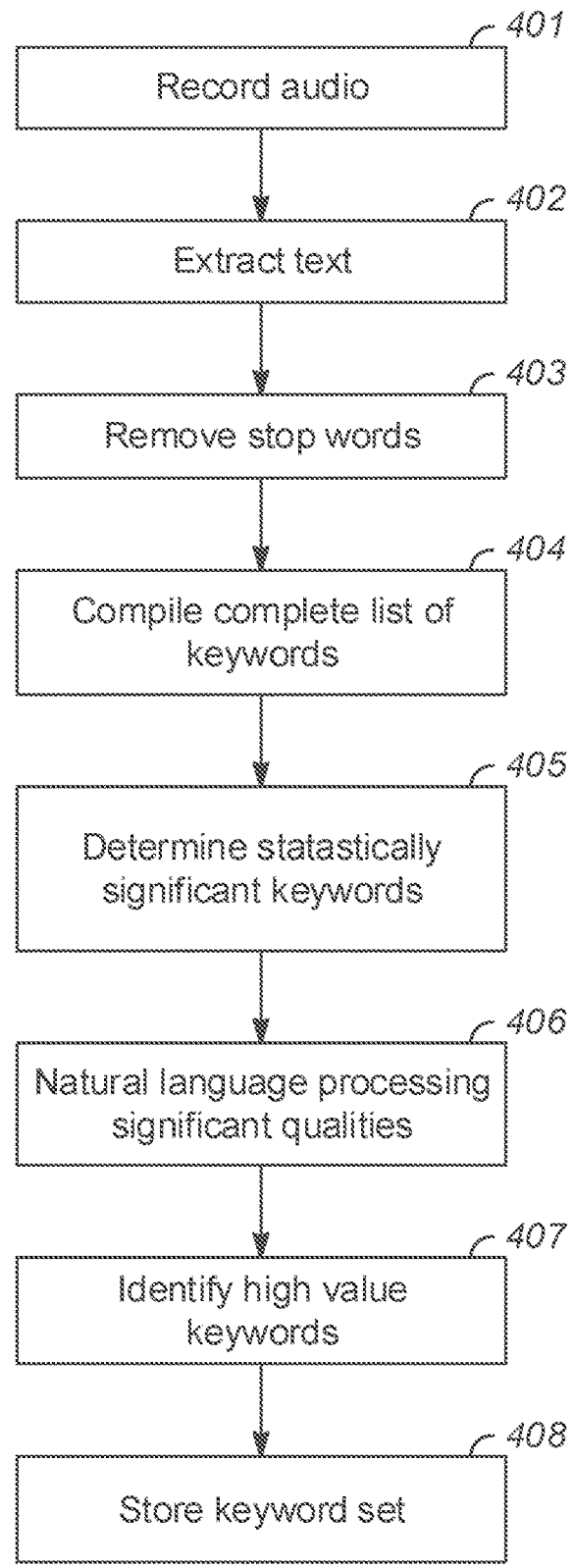
FIG. 5 is a flowchart showing a method of compiling a keyword set.

Keyword Data Set Compilation Module (FIG. 5)

In some examples, participants are evaluated at least in part based on the substantive content of the panel discussion. The keyword data set compilation module compiles a set of keywords that the participants used during the panel discussion. In some examples, the keyword data set contains a compilation of keywords from one panel discussion. In alternative examples, the keyword data set can contain keywords compiled from across multiple panel discussions. The keyword data set can be used to evaluate individual candidates or groups of candidates based on the substance of the conversation by the group in the panel discussion.

The method of compiling a complete keyword data set receives as input text extracted from recorded audio data that was recorded during the panel discussion. This can be performed in a number of ways. The system can extract text from audio data using speech to text software. In some examples, the system extracts text in real time as the panel discussion is being recorded by one or more microphones. In alternative examples, the audio track is stored in a non-transitory memory, and speech to text software is later used to extract text from the audio.

The system can extract text from the audio of some or all conversation participants. In some examples, however, the system will extract text only from the audio recorded for certain targeted individuals. For example, in some implementations, a job candidate is a participant in the panel interview. The system can be configured such that speech to text is performed only on the audio track for the job candidate, and the extracted keywords are used for evaluation of the job candidate. In further examples, if there are multiple job candidates present in a single panel interview, or multiple panel interviews each having one or more job candidates, the system could be configured so that speech to text is performed only on the substance spoken by the job candidates. The resulting keyword data set would be comprised just of the substance spoken by job candidates during one or more panel interviews. Each job candidate's individual performance in the substance of the interview can be compared to the keyword data set.

Turning to FIG. 5, in step 401, audio is recorded for one or more individuals present in the panel discussion. As noted above, the recorded audio input can be for one individual, such as a job candidate. The recorded audio input can also be for multiple individual participants in the panel discussion. Where the system uses multiple recorded audio inputs from multiple participants, each of the individuals' substantive participation in the discussion can be evaluated against the substance of the conversation during a single panel discussion. Where the system records multiple panel discussions, each of the individuals' substantive participation can also be evaluated against the substance of the multiple panel discussions.

In step 402, text is extracted from the recorded audio using speech to text software. This type of software is commercially available from a number of different companies, including but not limited to DRAGON® transcription software available from Nuance Communications, Inc., Burlington, Mass., USA. In some examples, the extracted text can be stored as a full-text transcription of the panel discussion. In some examples, error correction can be performed on the extracted text to identify potential errors. In some examples, the extracted text can be compared against a dictionary of known words. In some examples, the system can automatically remove some or all unknown words from the extracted text. Many different examples of initial processing of the full text of the discussion are possible and are within the scope of the technology.

In step 403, stop words are removed from the full text of the extracted audio. As used herein, a "stop word" is an insignificant word that does not provide statistically important information about the substance of the conversation. Short words, conjunctions, and similar words that are not related to the substantive content can be examples of stop words to remove from the full text. Particular stop words can be preselected for removal, or the system can use a statistical analysis on the full text to determine words that are unlikely to provide insight into the substance of the conversation.

In step 404, a complete list of keywords is compiled. The complete list contains keywords that can be used to evaluate an individual's performance against the performance of one or more other people in the panel discussion. In some examples, the system moves on to step 405, in which the system performs a statistical analysis of the keywords to determine keywords that are most likely to be useful in distinguishing one participant against others. For example, the system could eliminate commonly used words or phrases.

At step 406, natural language processing is used to determine qualities of keywords used in the discussion. For example, natural language processing can be used to contextualize or disambiguate keywords. Natural language processing can also be used to estimate a person's level of education, where they grew up, their level of familiarity with specific technical topics, and past experience with specific technical topics.

Optionally, at step 407, one or more high-value keywords can be identified. The high-value keywords can be words that are singled out as being especially relevant to the substance of the conversation, or of particular interest to the final evaluation of the panel participants. For example, if the keyword data set is related to one or more job candidates. Keywords that are highly relevant to the job opening can be selected as having a higher value than other keywords in the keyword set. Optionally, an algorithm can be used to determine which keywords are more important than others, so that the high-value keywords can be weighted more heavily when used as input into an evaluation of the participant's contribution to the conversation.

At step 408, the resulting keyword data set is stored in a non-transitory memory for later retrieval and processing during evaluation of the panelists. Note that the keyword data set is not simply a predetermined set of words that the system looks for in the text of the panel discussion. Instead, the keyword data set is particularly tailored to the specific conversation that was discussed in the panel discussion or multiple panel discussions. Thus, the system is not a one-size-fits-all approach, but instead contextualizes the substance of the discussion in the panel discussion and evaluates participants based on the actual conversation held between the multiple participants. This can be useful for situations in which the participants are speaking about a highly specialized topic, or where a particular word in the context of the conversation has a different meaning than its general meaning in the language.

A new keyword data set can be compiled when desired. For example, a keyword data set can be compiled for one or more panel interviews for a particular job opening. Alternatively, a keyword data set can be compiled for each company that uses the system, providing each company with a unique set of keywords that are specifically relevant to its own employees and operations. The system can start from scratch with a clean keyword data set each time the system is used.

Data Extraction Modules

The system uses a number of different software modules to extract information from recordings of the panel discussion. The data extraction modules take as input raw data input from the video, audio, and behavioral data sensors. The output of the data extraction modules is quantitative information about the individual participants' behaviors during the panel discussion. Data extraction modules can be used to identify particular participants in the discussion, and optionally associate the participants with their corresponding profiles in the profile database. Data extraction modules can use an input of the particular timestamp during the recording of the panel discussion and then extract data related to an event taking place around the time of the timestamp.

Participant Identification and Profile Matching Module

The participant identification module matches a participant's video input, audio input, and/or behavioral data sensor input to the identity of an individual so that the system associates all of these inputs with a specific person's profile in the database. If a name or other sufficient identifying information is not present in the system, a guest profile may be used. In an alternative arrangement, the participant identification module can associate an anonymized profile in the database with a participant's video input, audio input, and behavioral data sensor input. In any case, video input, audio input, and behavioral data sensor input of a single individual being recorded are linked together with a participant profile, whether that individual is explicitly identified, anonymized, or treated as a guest. A participant can be identified and matched to a profile in a number of different ways.

Predetermined Recording Devices Matched to Profile

In one example, each participant in the panel discussion is associated with a predetermined recorded stream of audio, video, and behavioral sensor data. Referring to the example of FIG. 2, the system can associate a preexisting participant profile in a participant database with individual 101. An administrator can initially assign the audio input of the microphone 121, the video input of the video camera 131, and the behavioral data sensor input of the behavioral data sensor 141 to the individual 101 having the preexisting participant profile. This can be done, for example, through a graphical user interface providing instructions to the processor for how to handle data input to the system. During later data extraction and analysis, data extracted from the audio input of the microphone 121, the video input of the video camera 131, and the behavioral data sensor input of the behavioral data sensor 141 will automatically be associated with the participant profile of the individual 101 based on this initial assignment by the administrator.

Differentiating Voice Prints and Associating Video and Behavioral Data with Audio In another example of identifying a participant and matching to a participant profile, one or more microphones record a plurality of individuals speaking during the panel discussion. The system can execute software to differentiate multiple voices within the audio stream or streams recorded by the one or more microphones. The system determines the total number of speakers. Using a voiceprint identification, each different voice can be temporarily assigned to a new profile for an unidentified participant. In cases in which all participants' data is to be anonymized, and anonymized identification number and the assigned to each voiceprint. In alternative examples, voiceprint identification can be used to personally identify one or more particular participants. Alternatively, a participant's voice can be manually identified and associated with an identified participant profile in the participant database.

Extracting Behavioral Data from Behavioral Data Sensor Input

Regardless of how many variables are measured, the data that is recorded is sequential data, which can be placed in an array in working memory. Each record in the array would correspond to an elapsed time interval, all together a sequential record set taken from the recording and read into memory as the data is being processed. Note that the bulk data is not necessarily saved in memory. Initially, the bulk data is read into working memory. After processing, the resulting observation and conclusion data can be written to a file. This method takes a lot of working memory but is more efficient than writing out raw files and later reading them into working memory again for processing.

The array of data points provided by the depth sensor of the system can measure distances of movement in millimeters, for which the mode for each point can be calculated. In one example, an assumed error rate is plus or minus 15 millimeters. The mode of a data set of distance measurements is the distance measurement that appears the most often. One goal of such a system is to distinguish minor fluctuations from actual posture changes. The mode, not an average, is used for each data point. The data set of distance measurements is associated with each unique body posture during the panel discussion. The mode of each data set, or unique body posture instance during the discussion, can be determined without saving the raw data.

As the recording progresses, and each moment of time elapses, the record from the virtual array would be written if the values therein represented a new mode for the body posture. This would thereby reduce the number of stored records quite drastically compared to recording data at small time intervals during the panel discussion. In one alternative method, the data is written out to a saved file and an algorithm is used to find the mode of all points at one time.

The system uses an analytical process to determine the most common postures for that individual and when the individual repeats those postures. In the method described here, the raw positional data could be discarded without affecting the accuracy of results.

The system can examine quantitative behavioral variables using numerical physical measurements. For example, the quantitative behavioral data may measure the changes in distance in millimeters. In some examples, a tolerance for movement, such as at least 15 millimeters or at least 10 millimeters, will be used before a movement is tracked. The use of a tolerance for movement will prevent false movement tracking due to respiration. For superior eye gaze and head movement tracking, multiple cameras are used, or alternatively a camera within a camera. One example of a camera within a camera is a camera with normal capabilities and with 3D scanning features. High camera resolution and high frame rate are desirable, such as 60 frames per second (fps) or 120 fps.

The system uses a specialized operating system or real-time operating system to increase the processing speed of the system to reduce frame loss. In one example, calculation delay is less than 50 milliseconds. The system assumes that human reaction time is between about 100-200 milliseconds. A large RAM memory is used to allow buffering and concurrent calculation from multiple servers.

Many types and qualities of data can be extracted from recordings of the panel discussion. The following are examples, though are not exhaustive:

Gaze Analysis: Eye movement is calculated in a two-dimensional image space with a number of key data points. A first data point is the maximum observed distance of movement within an elliptical or circular space of the eye shape. The analysis considers a wide variety of possible eye shapes when making this assessment. A second data point is the acceleration of eye movement based on the distance traveled and camera frame rate consistent with dispersions of the frame and network jitter. This value can be calculated in both the X and Y axes. Eye pixel positions will be captured at 100-200 millisecond intervals to determine the pixel per second acceleration rate of eye movement.

In order to measure the gaze analysis data points, in one example, all frame sequences are recorded in a buffer, then frame sequences are analyzed to look for a frame sequence with an eye gaze movement. In one example, each frame is separated in time from an adjacent frame by 100 milliseconds and the frame analysis reviews an eye gaze position at points A, B, C and D. If ray AB and AC are in the same direction, then ray ABC is a frame sequence with an eye gaze movement. Ray AD is examined to see if it is in the same direction as ray ABC. If yes, the frame showing point D is added to the frame sequence ABC to create frame sequence ABCD, to be the frame sequence with the eye gaze movement. If no, the system determines that the frame showing point D may be the beginning of a new frame sequence with an eye gaze movement. When a frame sequence with an eye gaze movement is identified, the timestamp of that frame sequence is recorded.

A blinking analysis will be performed, with a baseline calculation of average blink intervals. A total duration of the time that eyes are detected during the entire filming period is calibrated for network error and using the blinking analysis data.

For eye gaze tracking, both image detection and motion prediction can be used, with statistical modeling as a baseline. In some examples, it is assumed that a person is unlikely to look at extreme angles without turning their head because it is typically uncomfortable to do so. Thus, the system can narrow down where the gaze is likely to be.

A machine learning model can be created to consider additional personal/behavioral traits and contextual attributes to create additional eye gaze and head movement prediction. This is a model useful to calculate relevant participation scores, as well as empathy, engagement, organizational hierarchy, deference, culture, knowledge depth, emotional quotient, and intelligence quotient scores.

Attitude toward Speaker: Based on eye shape, head tilt, and/or upper body posture, individuals can also be evaluated for whether they are curious about what the speaker is saying or dismissive about the content. If the listener's head or body posture is tilted forward with raised eyebrows, the listener is assumed to be curious and engaged. If the listener is leaning back with folded arms and a furrowed brow, the listener is assumed to be skeptical of the content.

Magnitude of Speaker's Hand Gestures and Effect on Listener: The location of the speaker's hand or hands can be measured as a distance H from the center of the speaker's body. The focal point of the listeners can be observed, recorded, and measured for velocity of change of the focal point, V, during the time of the hand gesture ($T_G$) between Estimated Gaze Focus Beginning (EGFB) and Estimated Gaze Focus End (EGFE). EGFB and EGFE can be expressed as a distance as measured from the center of the speaker. The velocity of change of the focal point can be expressed as:

$$V=(EGFE-EGFB)/T_G$$

For a particular listener, the system can calculate a coefficient of focus (CoF):

$$CoF=(H/Max(H))*V$$

For a particular speaker time, the sum of the CoF values for each of the listeners can be calculated. The system can draw a preliminary conclusion that a listener with the largest sum for a particular speaker time is the panel member who is most affected by the speaker. The system can also make an estimate regarding whether the effect of the speaker on a listener was positive or negative. Using the center of the speaker as an axis, if the absolute value of EGFE is less than the absolute value of EGFB, then the listener looked toward the center of the speaker during the hand gesture. This is assumed to indicate a positive effect of the speaker on the listener. If the absolute value of EGFE is more than the absolute value of EGFB, then the listener looked away from the center of the speaker during the hand gesture.

The hand gesture values can be recorded to a temporary database as the system loops through the video file. The temporary database can then be evaluated to find a maximum.

Torso Motion in Relation to the Speaker: Torso motion indicators may also be analyzed to indicate if a listener turned towards or away from the speaker. A distance from the camera to the outer edges of the upper torso, commonly the shoulders, is assigned to a variable for each participant. From the perspective of the camera, the participant humans are identified and labeled as PH1, PH2, etc. An edge detection algorithm subroutine is run to identify the outer edge of the participant's torso in a recording of the discussion, which could be a recording from a depth sensor such as an IR camera or a recording from a video camera. The locations for the outer edges of each participant are tracked in a database. For example, coordinate location values for the left shoulder of a first participant at a given frame can be recorded as PH1LSX, PH1LSY, and PH1LSZ, corresponding to the x-, y-, and z-axes. Coordinate location values for the right shoulder of a first participant at a given frame can be recorded as PH1RSX, PH1RSY, and PH1RSZ. The system can identify a line between the coordinates for the left shoulder and the coordinates for the right shoulder record, and then identify a twisting motion of the torso if the z-axis values change.

If the speaker is on the right of the listener, and if the left shoulder of the listener comes closer to the camera than the right shoulder, then the system can conclude that the listener is pivoting towards the speaker and is interested in what the speaker is saying. If the speaker is on the right of the listener, and if the left shoulder of the listener is farther away from the camera than the right shoulder, or the right shoulder comes closer to the camera, then the system can conclude that the listener is relaxing their attention towards the speaker. Further, the data regarding indication of interest in the speaker can be weighted as to whether a plurality of the listeners react similarly, and how often. Each data point can be measured and scaled for the absolute size of the participant' bodies. The inverse position data can be graphed for the left and right of the speaker. Using these techniques, data conformity can be measured. From panel discussion to panel discussion, median ranges can be established by question, or by relative time period of the discussion. This data can be particularly measured, analyzed and compared for specific portions of the panel discussion, such as for the greeting or the farewell portions.

Emotional Analysis Using Eye Movements: The natural eye shape and eye size of individual participants will be calculated. Variations for individuals will be determined. Eye shape and gaze position is also analyzed in relation to other body parts and external inputs. One example of an external input to eye movement is what the participant is looking at. Eye movement will also be analyzed in relation to external noise, which may draw the participant's gaze and attention.

Emotional Analysis Using Lip Movements: Movement detection of the lips is similar to determining the shape transformation of the eyes. Lip movements will be analyzed and used as input for emotion analysis.

Calibration Using Neck Position: Neck position will be used as a reference for determining head movement and eye movement. Head and eye motion will be adjusted based on known neck position, e.g., adjusting the eye gaze detection when a participant looks toward or away from a computer screen or another participant.

Emotional Analysis and Calibration Using Shoulder Position and Motion: A participant's shoulder position is analyzed in relationship to other body parts in a three-dimensional space using multiple depth sensors.

Emotional Analysis and Calibration Using Spinal Position: Spinal position affects shoulder and hip movement which affects head and foot position. Analysis of these other measurements will be performed and all emotional and engagement states.

Calibration Using Hip Position: Hip position affects the location of the feet, similar to how shoulder position affects the location of the head and neck. Upper body movement tracking will be performed down to the hip and chair.

Analysis of Leg and Knee Position: Leg and knee position will be analyzed to detect whether legs are open or closed. An analysis will also be performed to determine whether the legs are crossed or uncrossed. Changes in the position of the legs and knees will also be timed for duration.

Analysis of Foot Position: When the participant is in a seated position, image and motion data from the waist down will be obfuscated, with the exception of foot movement and position. When the participant is sitting, foot position will be analyzed to determine whether the feet are far apart or close together. The position and direction of the participant's toes will be determined.

The position of the feet affects posture because it translates to torso lean. Shifting the feet to support the weight is an indicator of forward torso lean. This is a confirming indicator that reinforces the magnitude of body posture measurements. For example, a participant might tuck their feet under the chair. The observed range of motion for torso lean in such a circumstance is less than the maximum that the system could expect to see when a candidate's feet are planted forward.

Analysis of Arm and Elbow Position: Arm and elbow position will be analyzed to detect whether arms are open or closed. An analysis will also be performed to determine whether the arms are crossed or uncrossed. Changes in the position of the arms and elbows can be timed for duration of crossing and uncrossing.

Analysis of Hand Position: Hand motions and gestures, including sign language, can be recorded and analyzed.

Emotional Analysis and Calibration Using Chair Movement Combined with Seating Position: When the individual is seated, the system analyzes chair movement. For chairs that swivel, for example, the system measures how often the chair is swiveled, and the degree of movement. The chair position is also used in relation to the hip, foot, leg, arm, hand, and head position analysis.

Extraction of Data from Recorded Audio

Speech to text and audio analysis are used to detect the substantive content of the panel discussion, as well as the emotional investment of the participants. The speaker's words can be analyzed for overall verbal complexity. For example, verbal complexity can be measured by calculating a reading level and an average number of syllables per minute. Extracted text can be used to determine relevance to open job positions, if the speaker is a candidate for employment.

Event Modules

In some examples, the system uses event modules to identify events recorded during the panel discussion that will be analyzed in the evaluation modules. The event modules are run on recorded data to look for events known to be related to inputs for the evaluation modules. One example of an event is an answer from an individual participant to a question. Another example of an event is when two participants are speaking at the same time, which may be characterized as an interruption. Another example of an event is a change in an individual's body posture.

An interaction is identified as being possibly relevant to a participant evaluation for a particular participant. Later, a quantification of this interaction can be used as part of the input for participant evaluation. There can also be intermediate algorithms for deciding whether the "possibly relevant" interactions should be used as input. For example, the system may be structured to use the best four answers from a participant as input to its behavioral analysis. In this scenario, the system will input all of the answers into a first algorithm to choose which answers count as the "best." The selected best answers are then used as input into the evaluation algorithm (e.g., candidate score, candidate ranking, employee score, group interaction score). There are predetermined criteria for whether a participant's interaction is "good," "bad," or "other."

Event Identification Module

In some examples, the system can include an event identification module. The event identification module can be configured to analyze, identify, and detect specific acoustic events as they happen.

In some examples, the system can use distributed intelligence, such as a probability matrix that can assign and identify events for processing. Sequence-based modeling can build out the matrix. In some examples, a plurality (such as five or more) microphones and the sensor array are collecting data, and parallel processing of different algorithms can be used to speed up the processing time.

Given the plurality of microphones, the approximate location of the speaker can be reliably determined by ordering which microphone is providing the strongest input.

In a first step, the system can determine which speaker corresponds to which audio sample. The audio samples can be identified as starting and stopping when the audio input from the same microphone is dominant or strongest. In some examples, to prevent attributes with great numeric range from skewing the data away from the smaller numeric ranges, the system can average the input of the training set for each attribute. In effect, this removes outliers that would skew the data. For example, in some examples, the system can receive an input of an audio file. The audio file can be converted to a text file, such as by using a natural language processor or a speech to text processor. The system can remove stop words, as discussed herein, resulting in a plurality of words for further analysis, in some cases commonly referred to as a "bag of words." The "bag of words" can be analyzed for an attribute, such as sentiment. In various examples, each of the words in the "bag of words" can be assigned a value or a vector. Similar words (e.g. princess and queen) can be assigned similar values, whereas very different words (e.g. jump and valve) can be assigned very different values. The words can be shown visually, such as using t-distributed stochastic neighbor embedding (t-SNE), which is a localized hashing mechanism to map the keywords graphically and calculate distances between words in the "bag of words". Other high-dimension mapping algorithms can be used. In some examples, words can be grouped and averaged. In some examples, words that would skew the average in an undesirable way can be removed. In some examples, technical words, which can have large values or vectors assigned to them, can be removed from the analysis, such that they do not overly impact the results.

In a second step, the system can confirm the identification of the speaker in the first step. In some examples, according to facial biometric analogies, it can be known that there is a ratio between the inter-ocular distance and the distance between the eyes and mouth. Thus, once the system knows the position of the eyes from the gaze detection method, which can be recorded as (x1, y1) and (x2, y2), the system can locate the mouth center when the speakers are looking straight ahead. Further, upon rotation, the system can calculate where the mouth is via the head rotation from the gaze detector. For example, head rotation can be + or − Q degrees, the mouth at X, Y where X=(x1+x2)/2+/−(distance×sin(Q)), Y=(y1+y2)/2+/−(distance×cos(Q)). If there is no confirmation, the sample can be excluded from further processing.

In a third step, the system can identify what type of event is being identified. For example, the system can determine if one of the three scenarios is occurring:

A. Two-Speaker Dialog
B. Multi-Speaker Dialog
C. Hybrid event—such as audio silence, unintelligible speech, environmental sounds, multiple dialog misclassified as two-speaker dialog.

In some examples when hybrid events are identified, the event is not pursued, except for silence.

In a fourth step, the end of sample or segment is identified, such as by identifying a pause in the audio. In some examples, the cycle of steps one through four can be repeated, if applicable.

In various examples, another issue related to audio event identification can be facing environment changes from studio to site. In situation where the system is properly trained with real data recorded, various real-world environments can result in some situations beyond the ones observed in previous experiences. In some instances, the occurrence of sound events from the surrounding environment, if used to train the system, may lead to lower accuracy. Variability in the Signal to Noise Ratio (SNR) in the raw acoustic signal recorded by the sensors can be a major issue. Therefore, in some examples, a threshold can be included to limit the samples
processed in order to avoid false positives. In various examples, during testing, the threshold can be when more than one person is moving and/or speaking. As the system progresses, the threshold of more than one person moving or speaking can be removed or lowered to cacophony levels, such that fewer events are blocked from consideration. In some examples, this can also help reduce the demand on the CPU and other parts of the system.

The universe of audio events that can be detected in order to observe potential overlaps between different events. In some examples, the system can use a classifier able to identify more than one coexisting event at a time. In this regard, algorithms providing more than one output that rely on the audio event probability of occurrence can be included.

Reliability of the audio event estimation can be key. Finally, it can be assured that the data algorithm is trained using enough audio that ensures enough diversity for each category of sound events to be identified.

Speaker Interruption Engine

There may be many times throughout the discussion that two participants will talk simultaneously. This data can be used as part of the analysis, even if the voices of the two participants are not individually distinguishable.

In practice, it can be difficult to contextually analyze two voices speaking over each other in an audio data input stream. In some examples, it may be more practical to do one of the following. Where the voices of two participants are overlapping, the system creates a decision point, with these options:

1. Exclude that portion of the file from statistical analysis.
2. Define a variable, INTERRUPTION, and assign it a +1 for each time a targeted individual was speaking, and a different individual also spoke and continued speaking for three seconds beyond the cessation of speech by the targeted individual.
3. Define a variable, ACCOMMODATION, and assign it a +1 for each time the targeted individual was speaking and another individual also spoke and continued to speak, and the targeted individual did not speak for a minimum period of time, such as at least 30 seconds.
4. Assign the variable in #3 a more positive connotation for teamwork and/or willingness to listen.
5. Define a variable, ASSERTIVENESS, and assign it a +1 for each time the targeted individual was speaking and another individual also spoke, and then the targeted individual continued speaking for a minimum period of time, such as at least 30 seconds.
6. Look exclusively at the body language during that section. Look for evidence from the body language data that the candidate is inviting an interruption, is collaborating, or is sharing the floor.

In some examples, visual data can be used to determine which individual is speaking or which individuals are speaking. For example, lip movement recorded by a video camera or depth sensor can be used instead of parsing the audio track to determine when one person is speaking over another.

In any case, the system still analyzes the body language of both individuals if there was an overlap to speech to determine how each participant reacts to the interruption.

Tone of voice and body language contribute significantly to personal communication, in some cases much more than the content of the words. The system can mark and identify interruptions and generate a reference file. The reference file would stop and start video playback at a time interval such as 20 seconds before and 20 seconds after an interruption.

To generate a model for the interruption engine, a sample of interruptions are evaluated by individuals. The interruptions are presented in a random order. The individuals each generate a qualitative description of the interruption to determine a consensus for each individual sample interruption. For interruptions in which the evaluators disagree, the interruptions are presented for evaluation by a second set of individuals known to have high emotional intelligence. After this process is finished, the samples size can be, for example, on the order of 1,000 sample interruptions. The samples can be shrunk down to clips of 2-3 seconds before and after the time stamp of the event. The samples are each fed into a machine learning engine. The machine learning engine can generate a model to assign a qualitative assessment of the individual who was the source of the interruption, and the individual who was interrupted while speaking.

Figure 6:
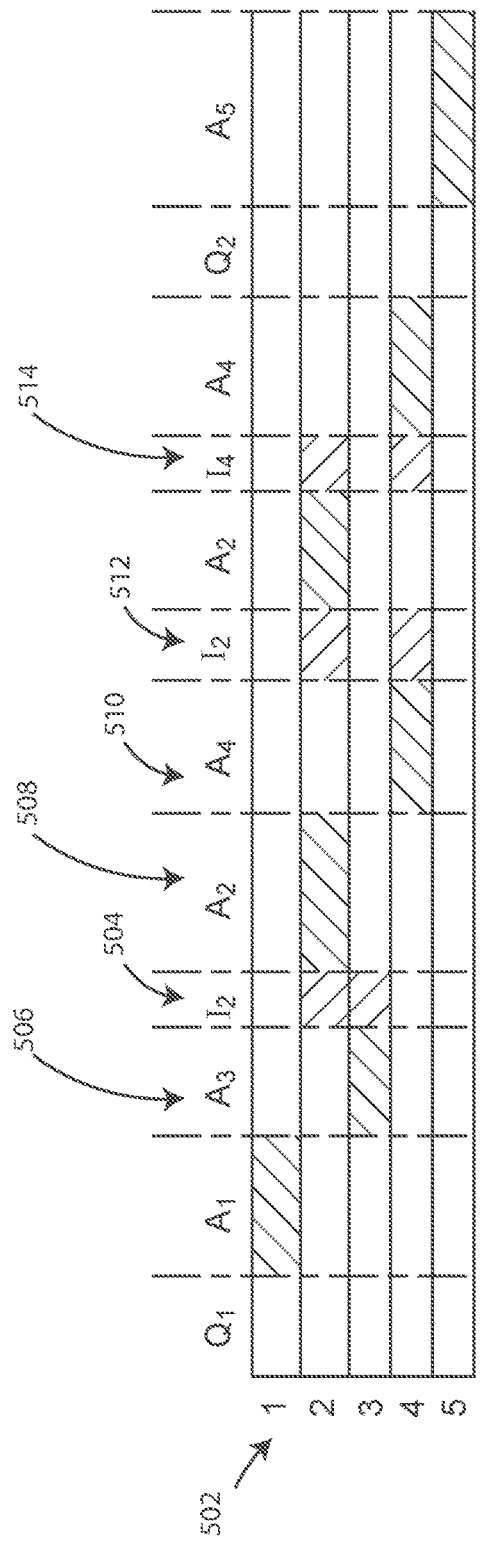
FIG. 6 is a schematic view of audio streams captured during recording panel discussions and their use in flagging interruptions.

FIG. 6 shows a schematic view of audio streams captured during recording panel discussions and their use in flagging interruptions. In various examples, a plurality of participants can participate in a group interview or discussion simultaneously. The participants 502 are shown on the left side of FIG. 6 as 1, 2, 3, 4, and 5. The participants 1, 2, 3, 4, 5 can be asked a first question Q1 and a second question Q2. A group interview or discussion can involve just one question, two questions, three questions, four questions, and other number of questions. The participants 502 can provide responses or answers to the questions. The answers can be uniquely attributed to the participant that provides the answer. For example, FIG. 2 reflects that A1 is an answer that was provided by participant 1, and A3 is an answer that was provided by participant 3. The system can record who provides an answer. In some examples, each participant can have an assigned microphone. If the microphone assigned to participant 1 provides the input audio to the system, it can be assumed that participant 1 answered the question.

If an answer provided by one participant overlaps in time with answer provided by a second participant, an interruption I can be recorded. The interruption I can be attributed to the participant that provides an answer while a previous answer is still being provided. For example, FIG. 6 attributes the first interruption I2 504 to participant 2, because participant 2 did not let participant 3 finish answer A3 506 prior to providing answer A2 508. It can further be seen in FIG. 6 that participant 2 interrupts participant 4 providing answer A4 510 at interruption I2 512. Participant 4 also interrupts participant 2 at interruption I4 514. As discussed above, the number of interruptions for each participant can be counted and tracked. Further, other types of behavior can also be tracked, such as the possible assertiveness of participant 4 interrupting participant 2 after participant 2 interrupted participant 4.

In some examples, the number of interruptions by a participant can be counted and tracked. If the number of interruptions exceeds a threshold the participant can be removed from the discussion, such as by disabling the microphone assigned to that participant. In some examples, the threshold can be a designated number of interruptions, such as two, three, four, or five interruptions. In some examples, the threshold can include a ratio of interruptions and a time period, such as two interruptions in five minutes or two interruptions in three questions.

Figure 7:
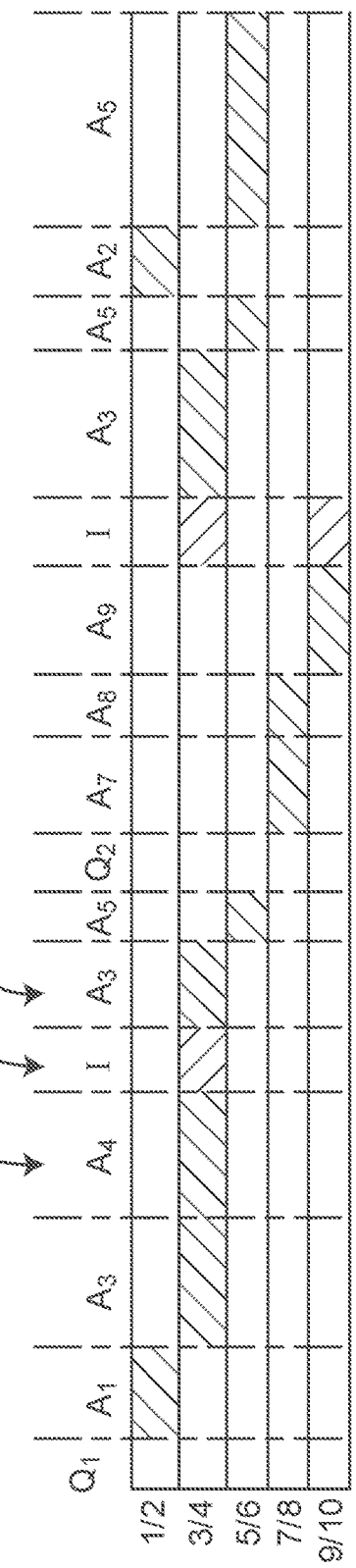
FIG. 7 is a schematic view of audio streams captured during an alternate system for recording panel discussions and their use in flagging interruptions.

FIG. 7 shows a schematic view of audio streams captured during an alternate system for recording panel discussions and their use in flagging interruptions. In some examples, a single microphone can be used by multiple participants. Each horizontal row in FIG. 7 represents a single microphone shared by two participants. As such, it can be known which participant the answer (or interruption) should be attributed to based solely on which microphone provided the audio stream. In the example shown in FIG. 7, one microphone is used for a pair of participants, such as one microphone for participants 1 and 2, one microphone for participants 3 and 4, one microphone for participants 5 and 6, one microphone for participants 7 and 8, and one microphone for participants 9 and 10. In contrast to FIG. 6, the system cannot attribute the input from one microphone to a specific participant, since more than one participant can be using the same microphone. In some examples, two participants that are using the same microphone can engage in an interruption event. For example, as shown in FIG. 7, participants 3 and 4 are sharing a microphone. Participant 4 can be providing an answer A4 602 to a question Q1, when participant 3 interrupts I 604 participant 4 with answer A3 606.

In some examples, audio analysis of the input audio can be used to determine which participant is talking during a specific segment. In some examples, gesture recognition analysis can be used to determine which participant is talking.

Flagging Events

The system can monitor for interaction events on-the-fly, or data can be stored and later analyzed to determine events. When scoring participants, the system uses the context of an event to evaluate a participant's response. The system searches for particular predetermined types of events in the panel discussion recordings. Events are associated with particular time segments in the recording. When an event is found, participant data that was recorded around the time of that event is analyzed. The system looks for particular signatures of events. The relevant data to be analyzed can be simultaneous with the event, or it can occur just before or just after the event, depending on which type of event is being evaluated and how it is evaluated.

Evaluation Modules

Conversation Contribution Score Module

In various examples, the system can determine the depth and extent of a candidate's substantive knowledge of the subject matter that they talked about during the discussion. In various examples, the system can determine the depth and extent of the candidate's knowledge based on keywords, and in some example, the system can score or rank candidates, such as to compare candidates to each other or to a threshold.

In some examples, the system can determine the candidate substantive knowledge by extracting keywords from spoken word data, such as discussed above in relation to FIG. 5. In various examples, the system can optionally use behavioral data relevant to the degree to which the candidate was actively participating in conversation, e.g. length of time speaking, speed of speaking, and/or timeliness of responses.

In some examples, the system extracts list of keywords from the candidate's audio using speech to text processing. The system can remove stop-words from the candidate's list of key words, as discussed above. Using the keyword data set (in relation to FIG. 5, above), the system can evaluate the candidate's extracted keywords. For example, the system can perform statistical analysis of how many keywords were used. The system can analyze how many high-quality keywords are used.

In some examples, the system can analyze a portion of the questions that candidates have answered. For example, if a candidate has answered a first number of questions, a user can select the top second number of answers, or a subset of the questions. If a candidate spoke 10 times, the system could first analyze each of the response against each other to determine which four questions were answered the best, such as by assessing the answers based on the most high-quality or relevant keywords. The system could use each candidate's top four answers to score candidates relative to each other, rather than using all answers that were collected.

In some examples, the system can produce a score for a candidate. The score can be representative of how much substance the candidate brought to the discussion. For example, if the candidate used many relevant keywords in answers, the candidate will receive a better score. In contrast, if there are fewer high-quality or relevant keywords used, the candidate will receive a worse score. In some examples, the score can be numerical, such as a number between 1 and 10, or a number between 1 and 100.

The system can further rank or organize the candidates against each other. In some examples, the ranking can be based solely on the score the candidates receive from the Conversation Contribution analysis. Ranking the candidates can allow a reviewer, such as a hiring employer, to easily identify which candidate had the highest quality of input to the conversation. In some examples, ranking the candidates can allow the reviewer to easily identify which candidates are above a threshold.

Participation Score Module

In various examples, the system can include a participation score module. The participation score module can be configured to provide an employer a score relating to the candidate's participation in the group dialog or in response to a question proposed to a candidate. The employer can use the participation score to determine which employees or candidates did not do well in the group dialog or in response to a question. The individuals that did not do well can be targeted for education or other options to improve the individuals.

The participation score module can be adapted to the employer's preferences. For example, if the employer is hoping to see lots of participation, physical evidence of engagement, minimal interruptions, or responses to more substantive questions, than the participation module can be configured to output scores related to the employer's desires.

In some examples, an individual's time-synchronized biometric data from during the discussion can be input into the module. The module can determine events that happen during an interview in which the employer wants to gauge the individual's participation, such as interruptions or when someone else is speaking. The system can analyze the behavioral data of the individual while the event was occurring. In some examples, this can be repeated for each of the individuals in the interview.

The system can output a score for each individual. The score can represent how well the individual participated in the discussion. In some examples, a threshold can be set for a minimum number of interactions. For example, an individual must interact at least three times to get a meaningful score. In some examples, the system can predict different outcomes of an event and create a model where, if a specific individual does a defined action/response, then the individual would get a higher or better score than if the individual did an alternative action/response. The system can flag or note positive or negative interactions in a database.

In some examples, an audio recording of the group dialog or of a response to a question can be processed to determine a participation score. In an example, the audio file can go through a two-step process to evaluate the content of the audio. In a first step the audio can be converted from audio to text. The stop words in the text file can be removed, such as described above. This step results in a text file without any of the stop words. In the second step, the text file can be analyzed for content. In some examples, the text file can be analyzed to measure average number of syllables and/or measure the complexity of words used. The analysis can provide a rating based on the language used. In some examples, the system can output a reading level in addition to a participation score.

Database Server for a Recorded Panel Discussion System

The system records multiple types of data inputs. In one example, a digital video camera produces a video input, a microphone produces an audio input, and one or more behavioral data sensors produce behavioral data input.

The system can also receive text data input that can include text related to the panel participants. And as described above, the system can extract keywords from the audio recorded of the individuals in the panel discussion.

Participant Database for a Recorded Panel Discussion System

The system can include a participant database stored on the participant database server. Data streams from the microphone 123, video camera 133, and behavioral data sensor 143 can all automatically be associated with a participant profile for the individual 103 in the participant database. In some examples, the participant database can have profiles for identified individuals. In some examples, the participant database can create anonymized profiles for individuals in the panel discussion.

As used in this specification and the appended claims, the singular forms include the plural unless the context clearly dictates otherwise. The term "or" is generally employed in the sense of "and/or" unless the content clearly dictates otherwise. The phrase "configured" describes a system, apparatus, or other structure that is constructed or configured to perform a particular task or adopt a particular configuration. The term "configured" can be used interchangeably with other similar terms such as arranged, constructed, manufactured, and the like.

All publications and patent applications referenced in this specification are herein incorporated by reference for all purposes.

While examples of the technology described herein are susceptible to various modifications and alternative forms, specifics thereof have been shown by way of example and drawings. It should be understood, however, that the scope herein is not limited to the particular examples described. On the contrary, the intention is to cover modifications, equivalents, and alternatives falling within the spirit and scope herein.

The invention claimed is:

1. A system for extracting data from a plurality of sensors comprising:
   a. one or more video cameras configured to record video input of at least a first participant and a second participant in a panel discussion;
   b. one or more behavioral data sensors spatially oriented to record behavioral data input of at least a first participant and a second participant, wherein the behavioral data sensors are depth sensors configured to measure a distance between the depth sensor and a participant, wherein the behavioral data sensors sense electromagnetic waves in the non-visible electromagnetic spectrum, wherein recorded behavioral data input from one of the one or more depth sensors includes behavioral data of both the first participant and the second participant;
   c. one or more microphones configured to record audio input of the at least first participant and second participant in the panel discussion;
   d. a local edge server connected to the one or more video cameras, the one or more behavioral data sensors, and the one or more microphones, wherein the edge server is configured to send synchronized video input, behavioral data input, and audio input of the first participant and the second participant to a network, the local edge server comprising a non-transitory computer memory and one or more computer processors;
   e. the non-transitory computer memory storing a participant database, the participant database including participant profiles for the at least first participant and second participant in the panel discussion; and
   f. the one or more computer processors in communication with the non-transitory computer memory, the one or more computer processors configured to:
      i. receiving recorded video input from the one or more video cameras from at least the first participant and second participant in the panel discussion;
      ii. receive recorded behavioral data input from the one or more behavioral data sensors from the at least first participant and second participant in the panel discussion;
      iii. receive recorded audio input from the one or more microphones of the at least first participant and second participant in the panel discussion;
      iv. time synchronize the received recorded video input, the recorded behavioral data input, and the recorded audio input;

v. identify a first event in the time synchronized video, behavioral data input, and audio input, wherein the first event comprises an interaction between the first participant and the second participant;
vi. identify a first participant profile associated with the first event, the first participant profile being assigned to the first participant in the panel discussion;
vii. extract biometric behavioral data from a portion of the recorded behavioral data input of the first participant, wherein the extracted biometric behavioral data of the first participant is associated with the first event;
viii. store the extracted biometric behavioral data of the first participant in the first participant profile;
ix. identify a second participant profile associated with the first event, the second participant profile being assigned to the second participant in the panel discussion;
x. extract biometric behavioral data from a portion of the recorded behavioral data input of the second participant, wherein the extracted biometric behavioral data of the second participant is associated with the first event; and
xi. store the extracted biometric behavioral data of the second participant in the second participant profile;
xii. analyze the extracted biometric behavioral data of the first participant to determine a change of the first participant's position relative to the second participant during the interaction; and
xiii. analyze the extracted biometric behavioral data of the second participant to determine a change of the second participant's position relative to the first participant during the interaction.

2. The system of claim 1, wherein the first participant is an employment candidate.

3. The system of claim 1, wherein the event is when the first participant is listening to the second participant.

4. The system of claim 1, wherein the event is when a first participant is interrupted by the second participant.

5. The system of claim 1, wherein the event is when a first participant interrupts the second participant.

6. The system of claim 1, wherein the extracted behavioral data comprises an initial position of the first participant's shoulders at the start of the first event and a second position of the first participant's shoulders at some point after the start of the first event;
wherein the one or more computer processors are further configured to: analyze the attention of the first participant to speech of the second participant based on the initial position and the second position of the first participant's shoulders.

7. The system of claim 1, wherein the extracted behavioral data comprises an initial position of the first participant's hands at the start of the first event and a second position of the first participant's hands at some point after the start of the first event.

8. The system of claim 7, wherein the one or more computer processors are further configured to: analyze the effect of the first participant on the second participant using the initial position and second position of the first participant's hands.

9. The system of claim 1, wherein the extracted behavioral data comprises an initial position of an outer edge of the first participant's torso relative to the second participant at the start of the first event.

10. The system of claim 9, wherein the extracted behavioral data comprises a second position of the outer edge of the first participant's torso relative to the second participant at some point after the start of the first event.

11. The system of claim 1, wherein the first event is when the first participant is speaking to the second participant;
wherein the one or more computer processors are further configured to: analyze the extracted behavioral data to determine whether the first participant was speaking passionately during the first event.

12. The system of claim 1, wherein the one or more computer processors are further configured to: analyze the extracted behavioral data to determine whether the first participant was reserved or outgoing during the first event.

13. The system of claim 1, wherein the one or more video cameras are further configured to record video input of a third participant in the panel discussion;
wherein the one or more behavioral data sensors are spatially oriented to record behavioral data input of the third participant;
wherein the one or more microphones are further configured to record audio input of the third participant in the panel discussion;
wherein the participant database includes a third participant profile for the third participant in the panel discussion;
wherein the first event comprises an interaction between the first participant, the second participant, and the third participant; and
wherein the one or more computer processors are further configured to:
i. identify the third participant profile associated with the first event;
ii. extract biometric behavioral data from a portion of the recorded behavioral data input of the third participant, wherein the extracted biometric behavioral data of the third participant is associated with the first event; and
iii. store the extracted biometric behavioral data in the third participant profile.

14. The system of claim 13, wherein the one or more video cameras are further configured to record video input of a fourth participant in the panel discussion;
wherein the one or more behavioral data sensors are spatially oriented to record behavioral data input of the fourth participant;
wherein the one or more microphones are further configured to record audio input of the fourth participant in the panel discussion;
wherein the participant database includes a fourth participant profile for the fourth participant in the panel discussion;
wherein the first event comprises an interaction between the first participant, the second participant, the third participant, and the fourth participant; and
wherein the one or more computer processors are further configured to:
i. identify the fourth participant profile associated with the first event;
ii. extract biometric behavioral data from a portion of the recorded behavioral data input of the fourth participant, wherein the extracted biometric behavioral data input of the fourth participant is associated with the first event; and
iii. store the extracted biometric behavioral data in the fourth participant profile.

15. The system of claim 1, wherein recorded video input from one of the one or more video cameras includes video data of both the first participant and the second participant.

16. The system of claim 1, wherein the extracted behavioral data of the first participant to determine a change of the first participant's position relative to the second participant comprises a position of the first participant's shoulders, and wherein the extracted behavioral data of the second participant to determine a change of the second participant's position relative to the first participant comprises the second participant's shoulder position.

17. A system for evaluating participants in a panel discussion, the system comprising:
  a. one or more behavioral data sensors spatially oriented to capture behavioral data of participants in a panel discussion, wherein the behavioral data sensors are depth sensors configured to measure a distance between the depth sensor and a participant, wherein the behavioral data sensors sense electromagnetic waves in the non-visible electromagnetic spectrum;
  b. one or more microphones configured to capture recorded audio of participant voices of the participants in the panel discussion;
  c. a non-transitory computer memory in communication with a computer processor; and
  d. computer instructions stored on the memory for instructing the processor to perform the steps of:
    i. receiving recorded audio input of the participant voices from the one or more microphones;
    ii. receiving first recorded behavioral data input from the one or more behavioral data sensors, the first recorded behavioral data input being of a first participant;
    iii. receiving second recorded behavioral data input from the one or more behavioral data sensors, the second recorded behavioral data input being of a second participant, wherein recorded behavioral data input from one of the one or more depth sensors includes behavioral data of both the first participant and the second participant;
    iv. identifying a time synchronization between the first and second recorded behavioral data inputs and the recorded audio input;
    v. identifying the first participant's voice in the recorded audio input, wherein the first participant is speaking to the second participant;
    vi. identifying a first time segment of the recorded audio input as containing spoken content by the first participant;
    vii. identifying the second participant's voice in the recorded audio input, wherein the second participant is speaking to the first participant;
    viii. identifying a second time segment of the recorded audio input as containing spoken content by the second participant;
    ix. in response to identifying the first time segment, extracting biometric behavioral data captured during the first time segment from the second recorded behavioral data input;
    x. in response to identifying the second time segment, extracting biometric behavioral data captured during the second time segment from the first recorded behavioral data input;
    xi. analyzing the extracted biometric behavioral data of the second participant captured during the first time segment to determine a position of the second participant relative to the first participant during the interaction between the first participant and the second participant; and
    xii. analyzing the extracted biometric behavioral data of the first participant during the second time segment to determine a position of the first participant relative to the second participant.

18. The system of claim 17, wherein the first participant is an employment candidate.

19. The system of claim 17, further comprising computer instructions stored on the memory for instructing the processor to perform the steps of:
  i. associating an anonymized participant profile with the first participant, the anonymized participant profile being stored in a participant database in a non-transitory computer memory;
  ii. associating an identified participant profile with the second participant, the identified participant profile being stored in the participant database;
  iii. storing the extracted biometric behavioral data captured during the second time segment in the anonymized participant profile; and
  iv. storing the extracted extracting biometric behavioral data captured during the first time segment in the identified participant profile.

* * * * *